Figure 9:
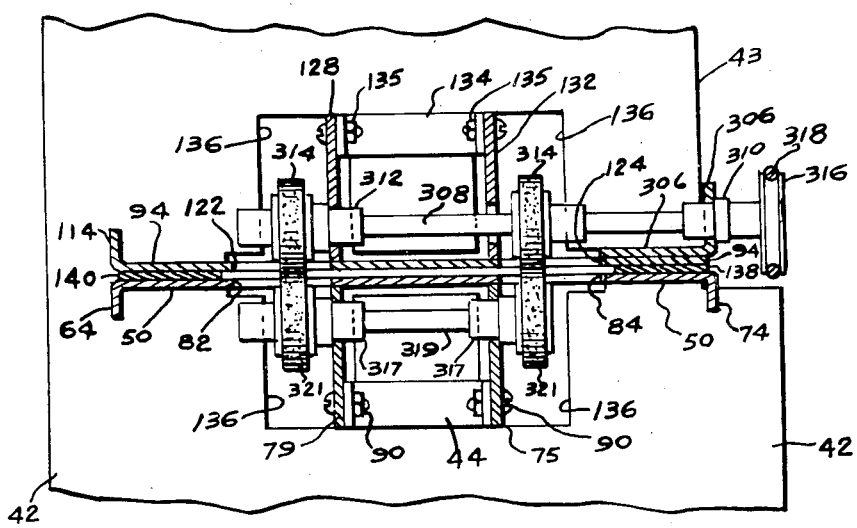

Dec. 1, 1964   L. J. CARLSON ETAL   3,159,277
CURRENCY DETECTORS
Filed Dec. 1, 1960   11 Sheets-Sheet 1
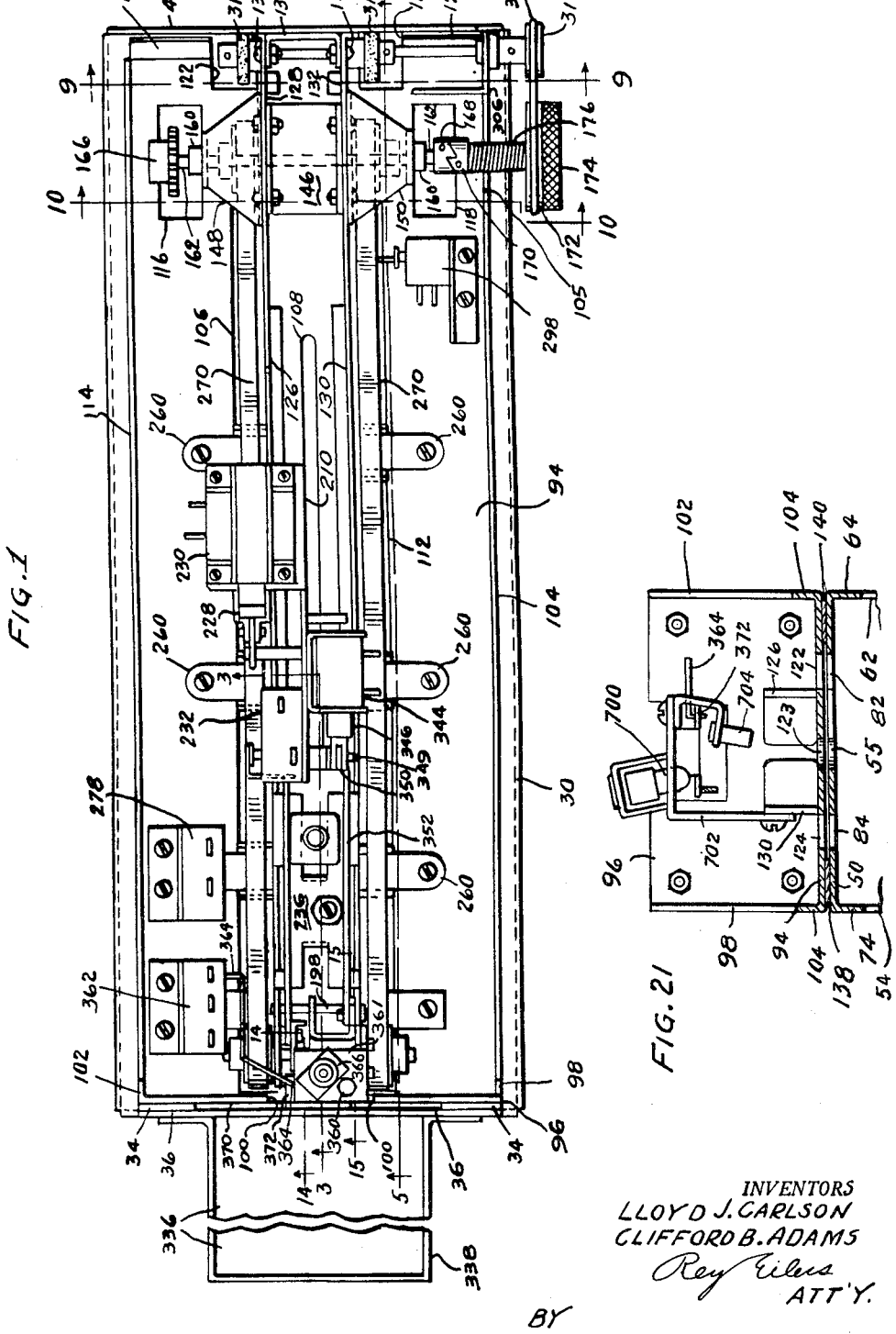
INVENTORS
LLOYD J. CARLSON
CLIFFORD B. ADAMS
BY Rey Eilers
ATT'Y.

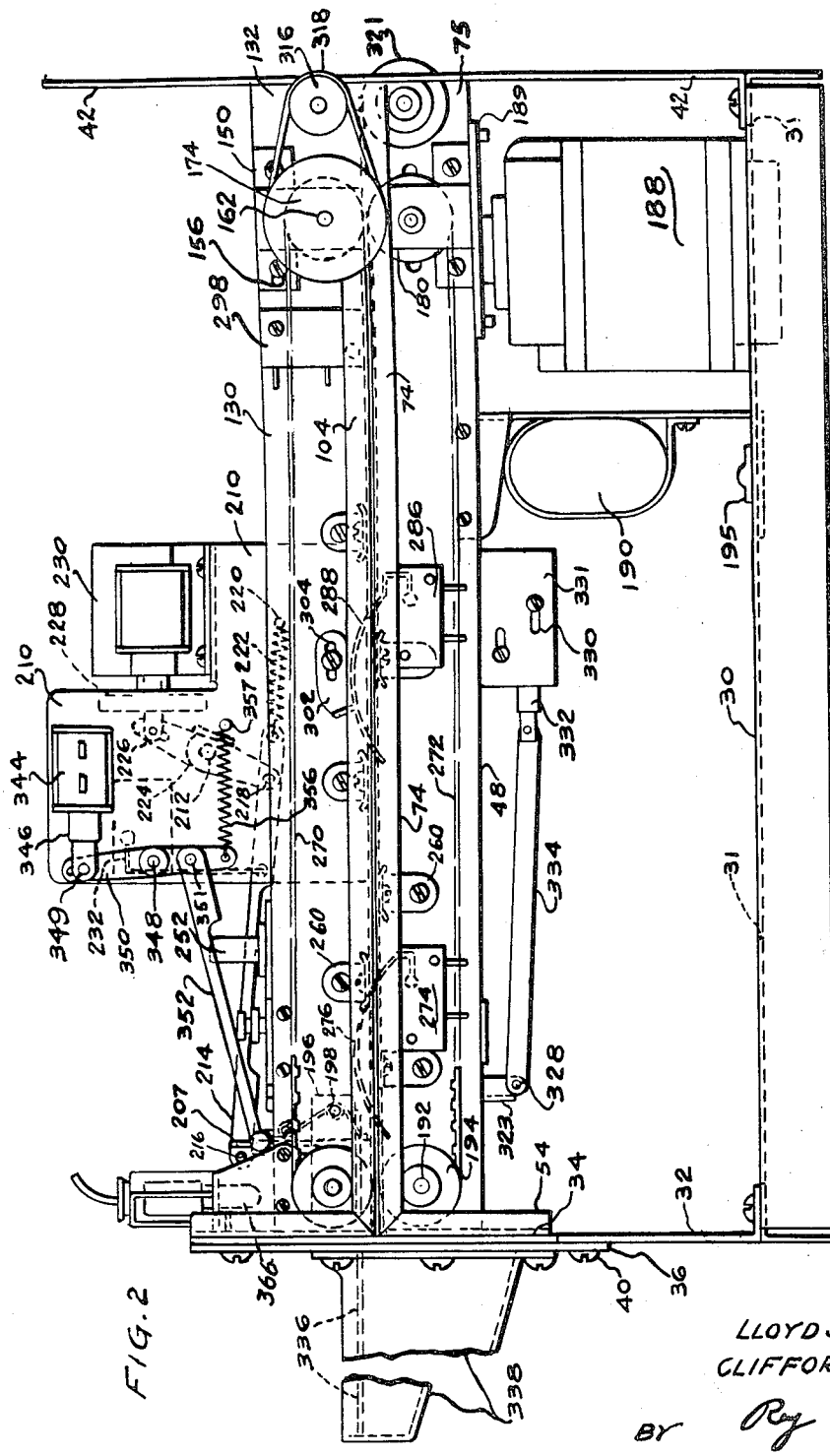

Dec. 1, 1964   L. J. CARLSON ETAL   3,159,277
CURRENCY DETECTORS
Filed Dec. 1, 1960   11 Sheets-Sheet 3
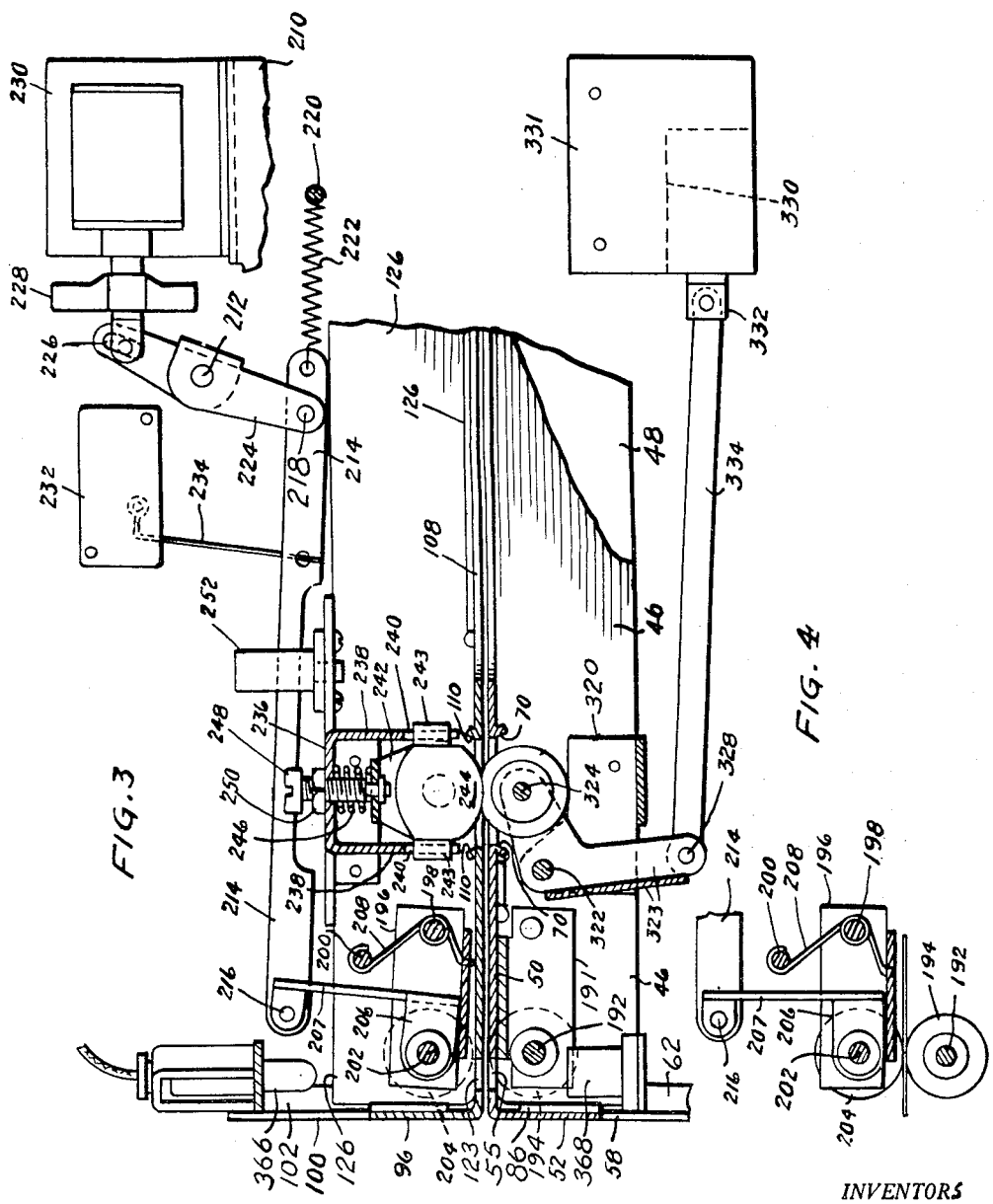
INVENTORS
LLOYD J. CARLSON
CLIFFORD B. ADAMS
BY Rey Eilers
ATT'Y.

Dec. 1, 1964   L. J. CARLSON ETAL   3,159,277
CURRENCY DETECTORS
Filed Dec. 1, 1960   11 Sheets-Sheet 4
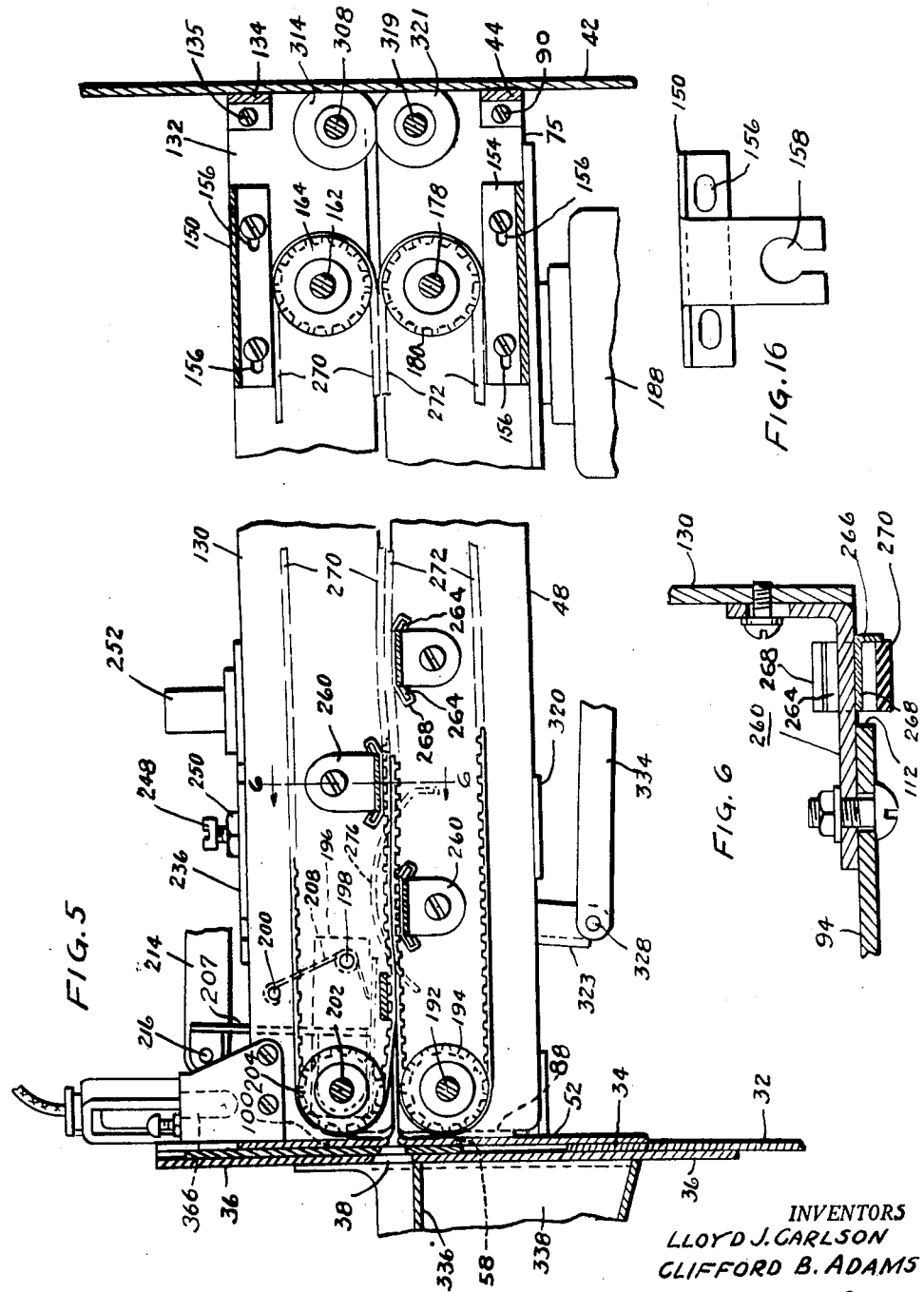
INVENTORS
LLOYD J. CARLSON
CLIFFORD B. ADAMS
BY Rey Eilers
ATT'Y.

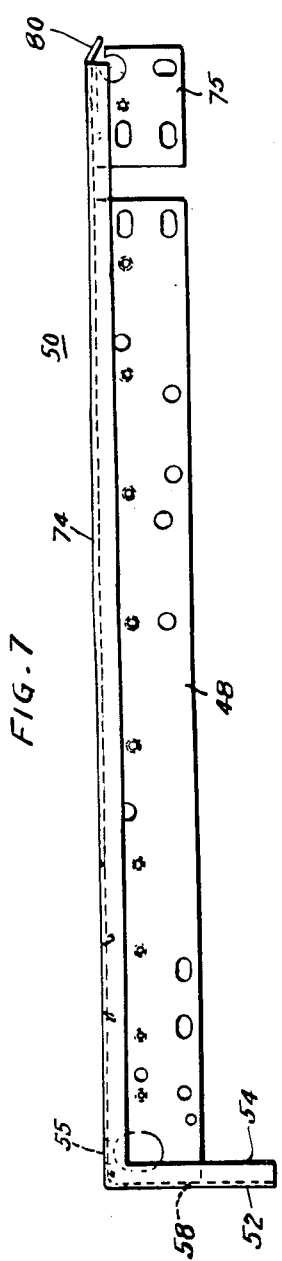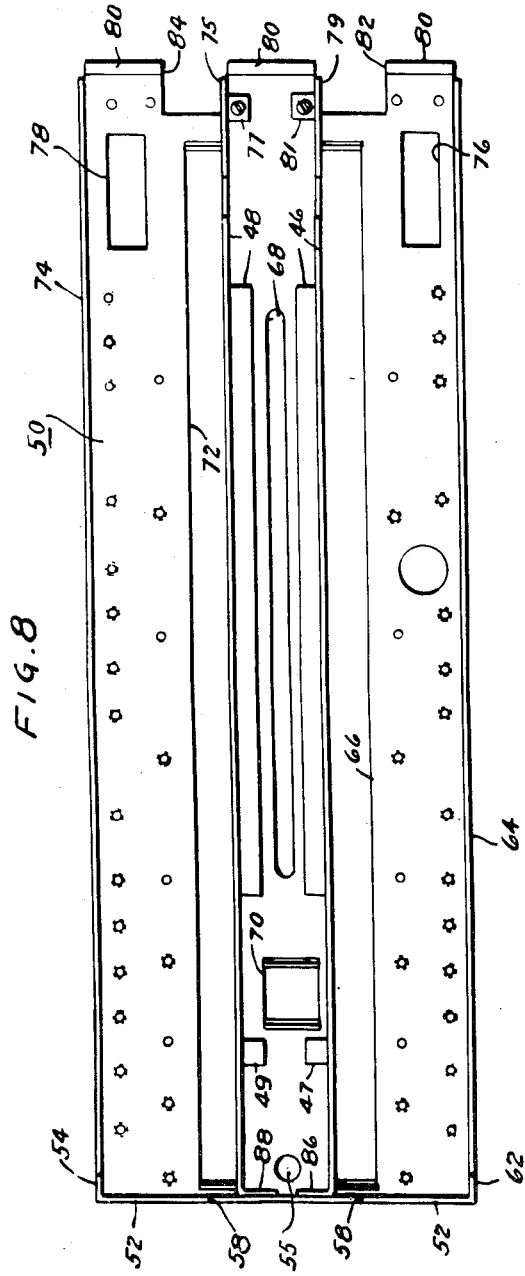

INVENTORS
LLOYD J. CARLSON
CLIFFORD B. ADAMS
BY Rey Eilers
ATT'Y.

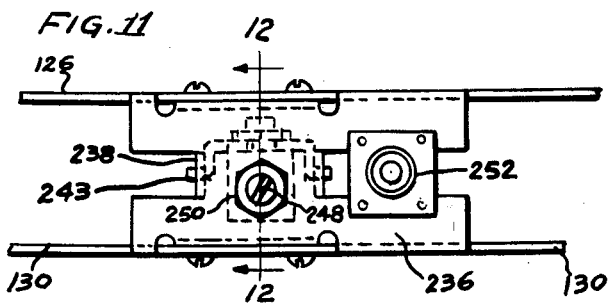
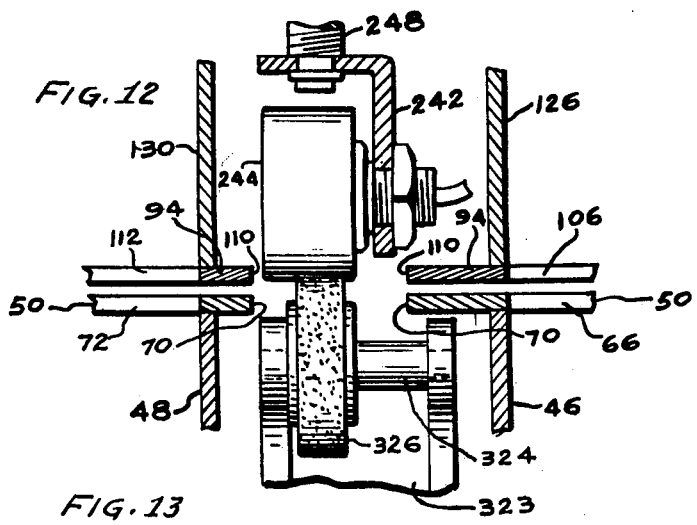
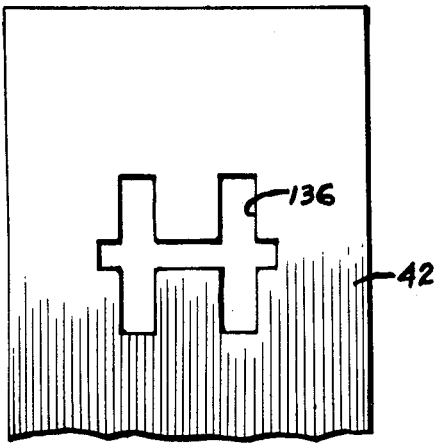
INVENTOR.
LLOYD J. CARLSON
CLIFFORD B. ADAMS
BY Roy Eilers
ATT'Y.

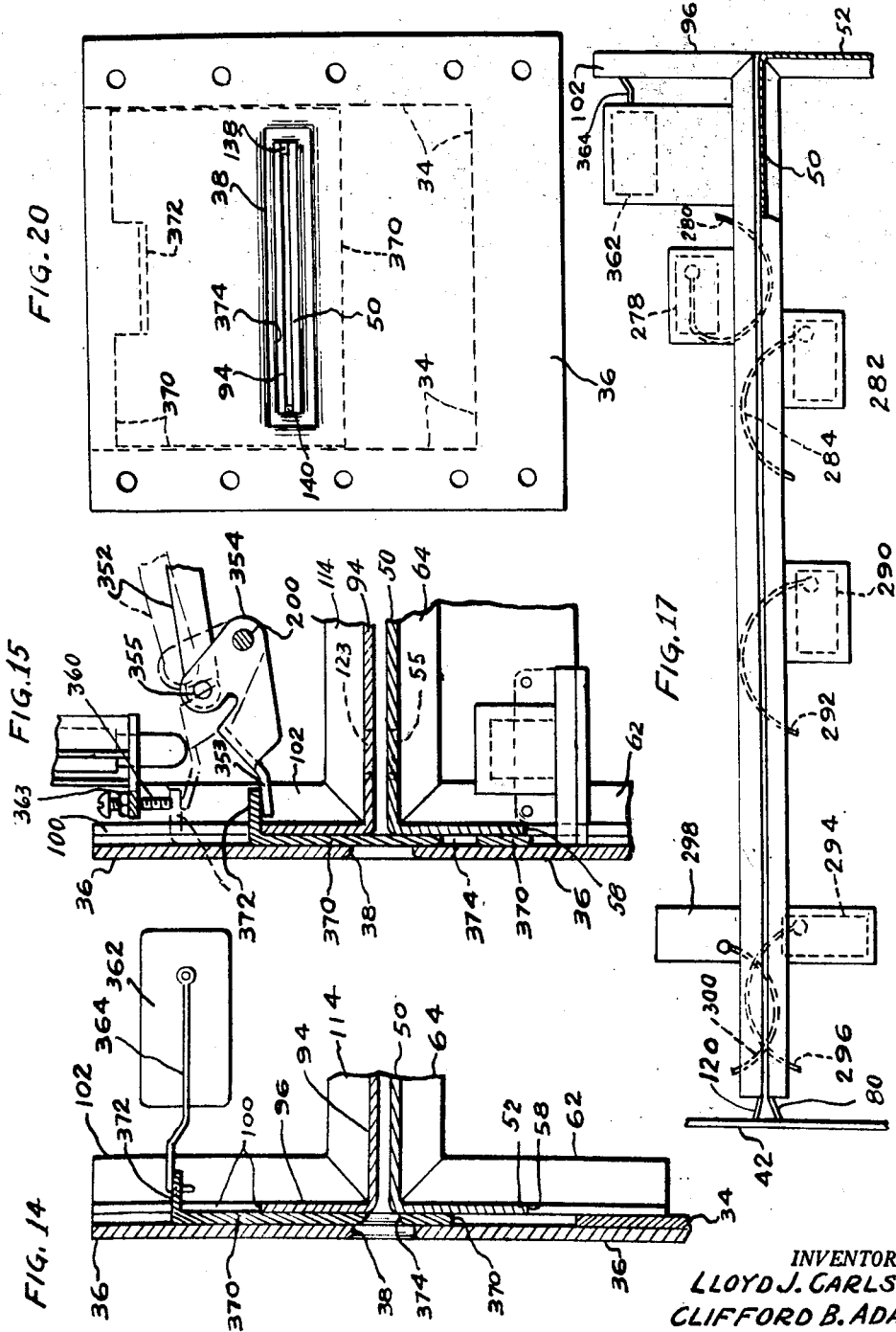

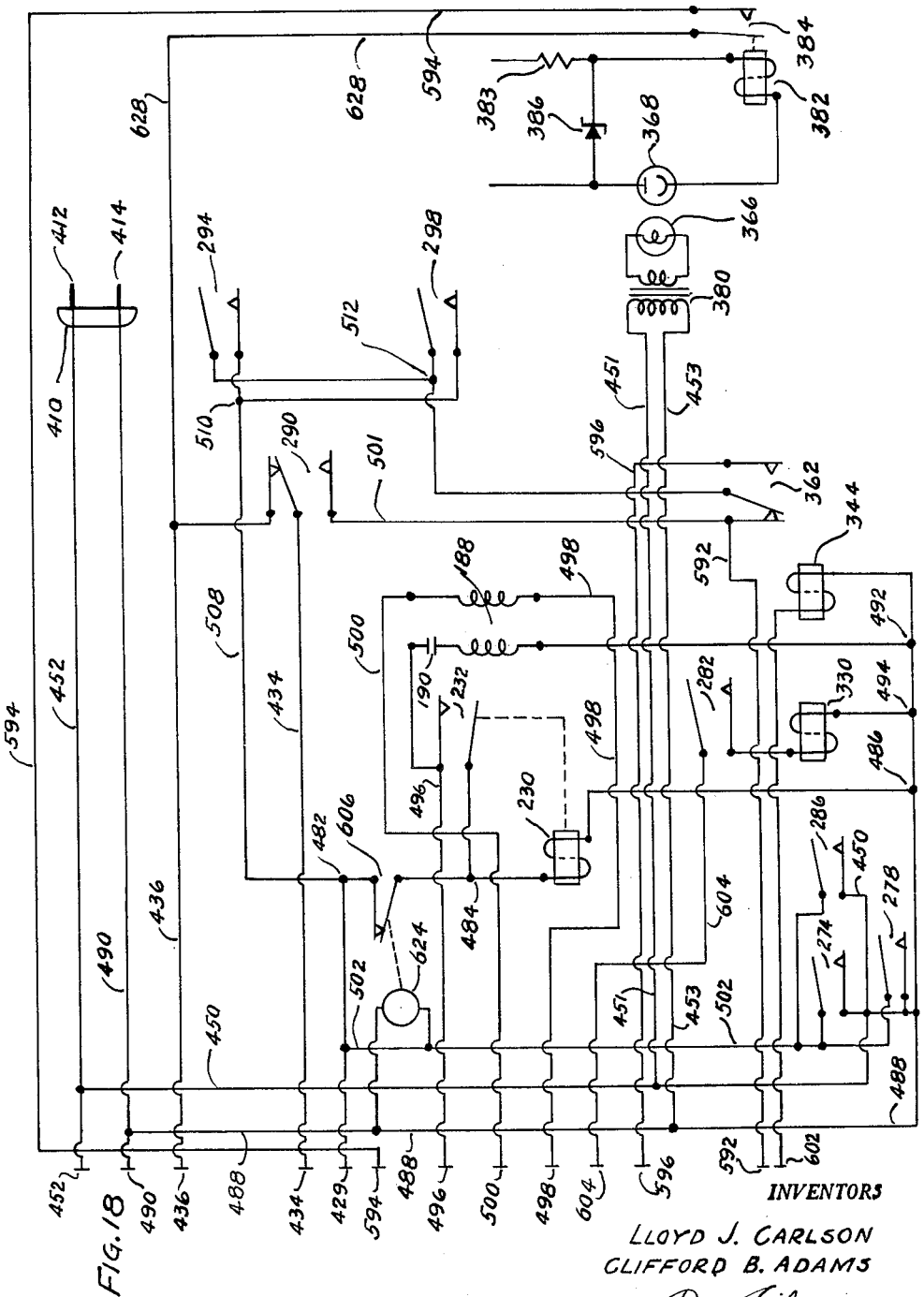

INVENTORS
LLOYD J. CARLSON
CLIFFORD B. ADAMS
BY Reg Eilers
ATT'Y.

INVENTORS
LLOYD J. CARLSON
CLIFFORD B. ADAMS
BY Roy Eilers ATT'Y.

United States Patent Office 3,159,277
Patented Dec. 1, 1964

3,159,277
CURRENCY DETECTORS
Lloyd J. Carlson and Clifford B. Adams, Bellefontain Neighbors, Mo., assignors to National Rejectors, Inc., St. Louis, Mo., a corporation of Missouri
Filed Dec. 1, 1960, Ser. No. 73,062
1 Claim. (Cl. 209—73)

This invention relates to improvements in currency detectors. More particularly, this invention relates to improvements in methods and apparatus for identifying authentic paper currency.

It is therefore an object of the present invention to provide an improved method and apparatus for identifying authentic paper currency.

In the operation of apparatus for identifying authentic paper currency, it is customary to place a bill, wholly or partly, within a tray or slot and then to move that tray or to push a button. This can require the use of both of the patron's hands, and it would be desirable to provide apparatus for identifying authentic paper currency which could easily be operated with just one hand. The present invention provides such apparatus; and it is therefore an object of the present invention to provide an apparatus for identifying authentic authentic paper currency which can easily be operated with just one hand.

The present invention causes a bill to interrupt a light beam as the leading edge of that bill passes through a slot, and the interruption of that light beam causes a bill-transporting device to grip the bill and move it forwardly. This is desirable because the patron need only insert the leading edge of the bill into a slot and need not move a tray or push a button. Furthermore, this is desirable because it keeps patrons from pushing the leading edges of inserted bills against a stop within the bill-transporting device and thereby causing those leading edges to crumple or wrinkle. It is therefore an object of the present invention to provide apparatus for identifying authentic paper currency which uses a light beam that is interrupted by the leading edge of an inserted bill to start the operation of that apparatus.

If an inserted bill is found to be unacceptable, that bill should be returned to the patron. As that bill is returned to the patron by the bill-transporting device, it will again intercept the light beam; and that second interception of the light beam must not be permitted to start the bill moving in the forward direction again. The present invention keeps the second interception of the light beam from causing the bill to start moving in the forward direction again; and it is therefore an object of the present invention to provide apparatus for identifying authentic paper currency wherein interruption of a light beam starts a bill moving in the forward direction but wherein interruption of that light beam as the bill moves in the reverse direction will not cause that bill to start moving in the forward direction again.

Other and further objects and advantages of the present invention should become apparent from an examination of the drawing and accompanying description.

In the drawing and accompanying description, a preferred embodiment of the present invention is shown and described but it is to be understood that the drawing and accompanying description are for the purpose of illustration only and do not limit the invention and that the invention will be defined by the appended claims.

Figure 10:
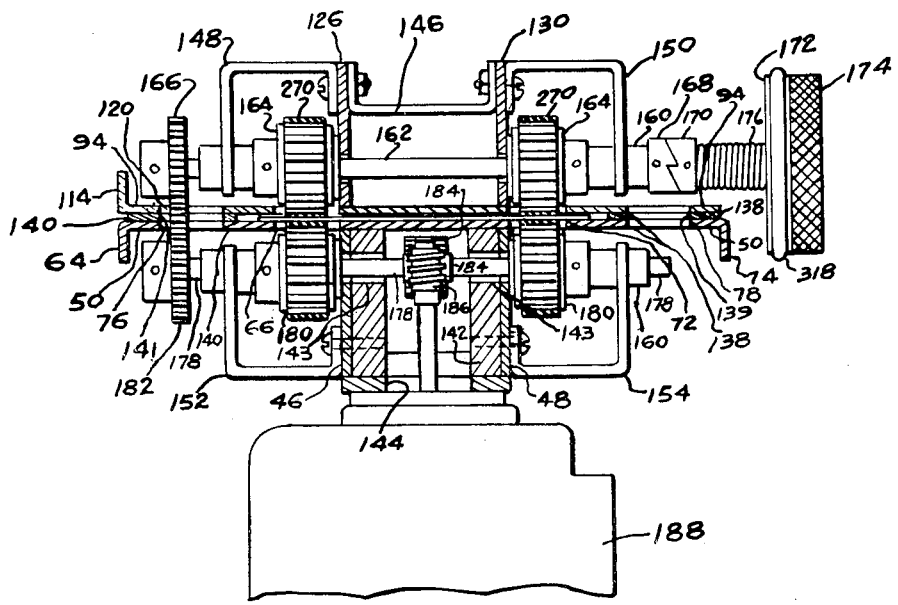
Figure 19:
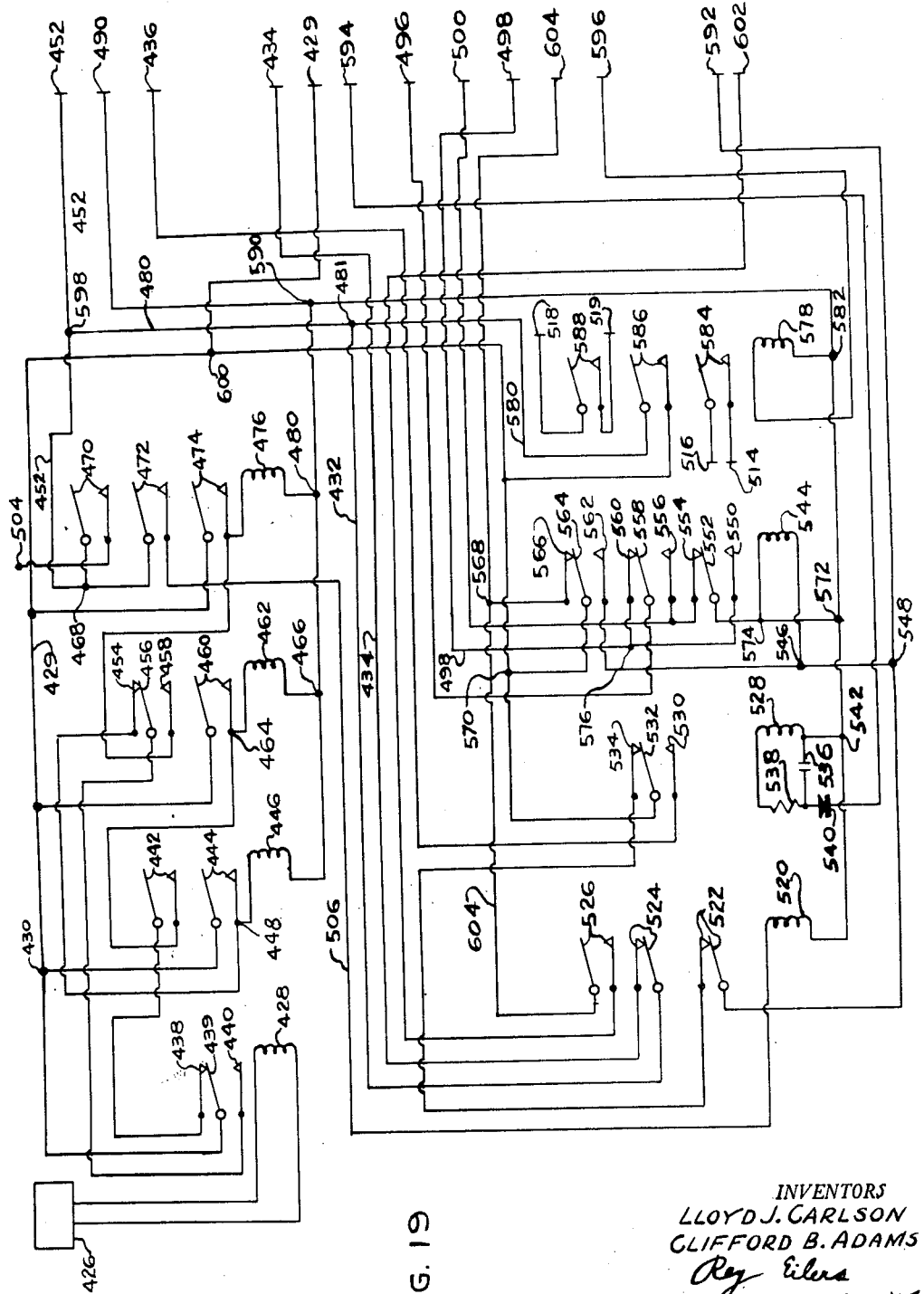
Figure 22:
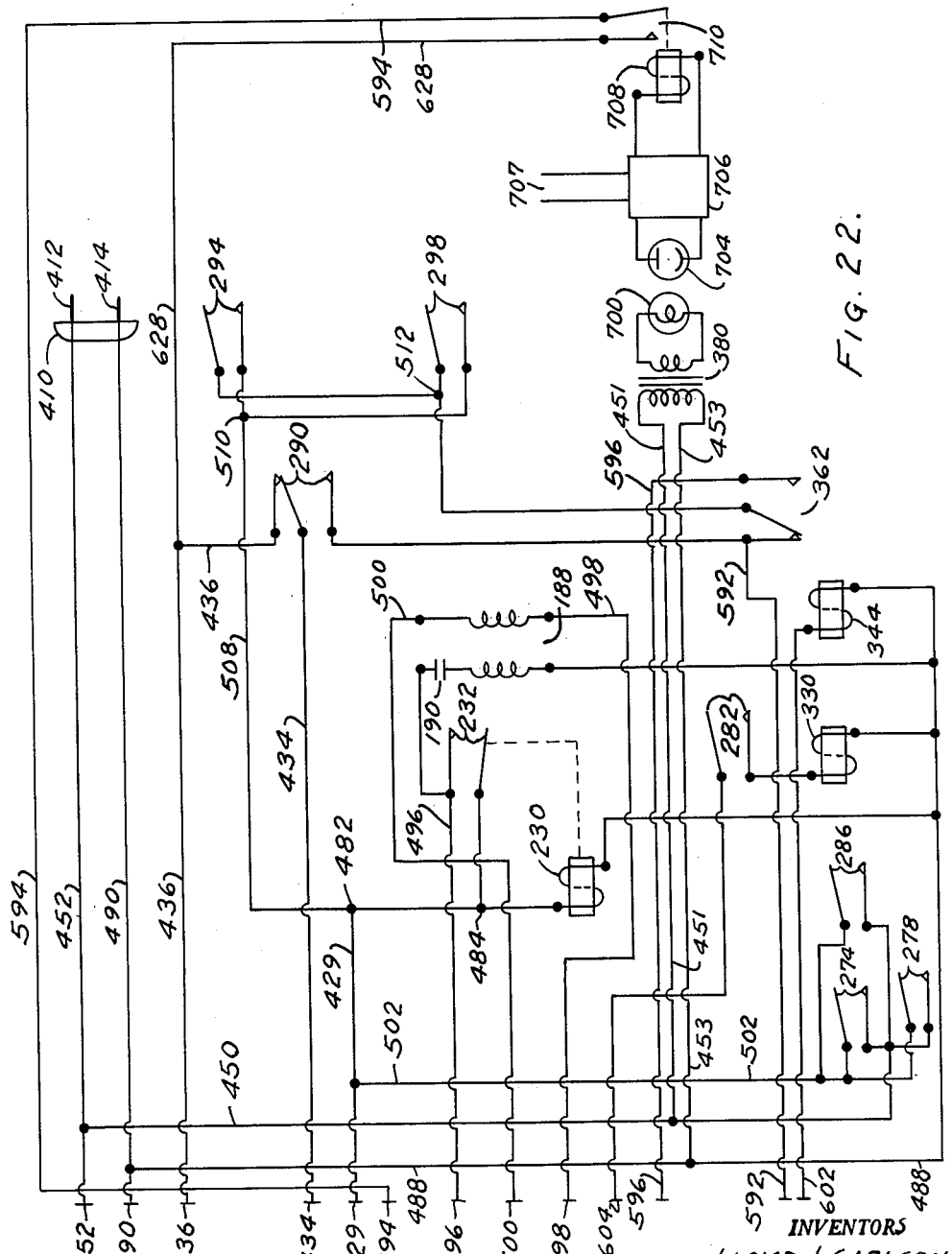

In the drawing, FIG. 1 is a broken, plan view of one embodiment of bill-transporting device that is made in accordance with the principles and teachings of the present invention, FIG. 2 is a broken, side elevational view of the embodiment of bill-transporting device shown in FIG. 1, FIG. 3 is a broken, sectional view through the embodiment of bill-transporting device shown in FIG. 1, and it is taken along the plane indicated by the line 3—3 in FIG. 1, FIG. 4 is a sectional view of a few of the components of FIG. 3, it is taken along the plane indicated by the line 3—3 in FIG. 1, and it shows the shaft-carrying bracket of FIG. 3 in lowered position, FIG. 5 is a broken, sectional view through the embodiment of bill-transporting device shown in FIG. 1, and it is taken along the plane indicated by the line 5—5 in FIG. 1, FIG. 6 is a sectional view, on a very large scale, through the embodiment of bill-transporting device shown in FIG. 1, and it is taken along the plane indicated by the line 6—6 in FIG. 5, FIG. 7 is a side elevational view of the lower platen and associated parts used in the embodiment of bill-transporting device shown in FIG. 1, FIG. 8 is a bottom view of the platen and associated parts shown in FIG. 7, FIG. 9 is a sectional view through the embodiment of bill-transporting device shown in FIG. 1, and it is taken along the plane indicated by the line 9—9 in FIG. 1, FIG. 10 is a sectional view through the embodiment of bill-transporting device shown in FIG. 1, and it is taken along the broken plane indicated by the line 10—10 in FIG. 1, FIG. 11 is a plan view, on an enlarged scale, through the bracket which holds the mounting for the magnetic head of the embodiment of bill-transporting device shown in FIG. 1, FIG. 12 is a sectional view, on a still larger scale, through the bracket of FIG. 11, and it is taken along the plane indicated by the line 12—12 in FIG. 11, FIG. 13 is an elevational view of the rear plate of the embodiment of bill-transporting device shown in FIG. 1, FIG. 14 is a sectional view, on a larger scale, through part of the embodiment of bill-transporting device shown in FIG. 1, and it is taken along the plane indicated by the line 14—14 in FIG. 1, FIG. 15 is a sectional view, on the scale of FIG. 14, and it is taken along the plane indicated by the line 15—15 in FIG. 1, FIG. 16 is a side elevational view of a J-shaped bracket used in the embodiment of bill-transporting device shown in FIG. 1, FIG. 17 is a partially-sectioned side view of the opposite sides of the platens of FIG. 2, and it shows the switches mounted on those platens, FIG. 18 is a schematic diagram of part of the electrical circuit for the bill-transporting device shown in FIG. 1, FIG. 19 is a schematic diagram of a further part of the electrical circuit for the bill-transporting device shown in FIG. 1, FIG. 20 is a front view of the front plate of the device of FIG. 1 when the bill-supporting platform is removed, FIG. 21 is a view, on a larger scale, of another lamp and light-sensitive element, and FIG. 22 is a schematic diagram of a circuit incorporating the lamp and light-sensitive element of FIG. 21.

Referring to the drawing in detail, the numeral 30 denotes a base for one embodiment of currency identification device that is made in accordance with the principles and teachings of the present invention. That base is generally rectangular in plan, and it has a stiffening flange that extends downwardly from the sides and ends thereof. That base has a large opening 31 therein, and that opening begins at a point about one third of the way toward the rear of that base, and that opening extends almost all the way to the rear of that base.

The numeral 32 denotes a vertically-directed plate which has a horizontally-directed flange at the bottom thereof; and that flange serves as a foot. As indicated particularly by FIG. 2, the foot of the plate 32 is secured to the base 30 adjacent the front edge of that base. A plate 34 of U-shaped configuration is disposed above the plate 32, and that plate lies in the same plane as the lower plate 32. The closed end of the U-shaped plate 34 rests on the top of the plate 32, and the arms of that plate project upwardly from the plate 32. A front plate 36 overlies the front face of the plate 34, and also projects downwardly beyond the bottom of that plate to overlie the front portion of the upper part of the plate 32. A horizontally-directed opening 38 is formed in the plate 36, and that opening is wide enough to accommodate a dollar bill when that bill is inserted lengthwise through that opening. Fasteners 40, shown in the form of machine screws, pass through openings adjacent the bottom of the front plate 36 and seat in threaded openings adjacent the upper end of the plate 32.

The numeral 42 denotes the rear plate for the embodiment of currency identification device shown by FIG. 1, and that plate has a horizontally-directed flange which acts as a foot. As indicated particularly by FIG. 2, the flange on the plate 42 is secured to the top of the base 30. The rear plate 42 is parallel to the plate 32, and it is register with that plate. A U-shaped bracket 44 is suitably secured to the front face of the rear plate 42; and spot welds constitute a convenient way of securing that bracket to that plate. The upper right hand corner of the rear plate 42 is cut-away at 43, as shown particularly by FIG. 9.

The numeral 50 generally denotes a horizontally-directed platen which is disposed above and which is parallel to the base 30. That platen has a downwardly-extending wall portion 52 at the front thereof; and that wall portion has a vertical flange 54 at one side thereof, has a centrally-located rectangular opening 58 extending upwardly from the lower edge thereof, and has a vertical flange 62 at the other side thereof. The flanges 54 and 62 act to stiffen the wall portion 52. The platen 50 has a flange 64 which extends downwardly from one of the elongated sides thereof, and that flange is contiguous with the vertical flanges 62 and extends almost all the way to the rear edge of that platen. An elongated opening 66 is formed in the platen 50, and that opening is parallel to the flange 64. An elongated slot 68 is formed in the platen 50, and that slot is formed at the longitudinally-extending center line of that platen. As indicated particularly by FIG. 8, the slot 68 is shorter than the opening 66. An opening 70 is provided in the platen 50 near the front of that platen; and that opening is in register with the elongated slot 68. That opening is wider than the slot 68, and it is intermediate that slot and the wall portion 52. A second elongated opening 72 is provided in the platen 50; and that opening is parallel to, and has the same length as, the opening 66. The openings 66 and 72 are disposed on opposite sides of the elongated slot 68. A flange 74 is formed at the other elongated side of the platen 50, and that flange extends downwardly to the level of the bottom edge of the flange 64. That flange is contiguous with the vertical flange 54 of the vertical wall portion 52, and it extends almost all the way to the rear edge of the platen 50. The flanges 64 and 74 reinforce and stiffen the platen 50. A rectangular opening 76 is formed adjacent the rear edge of the platen 50, and that opening is intermediate the flange 64 and the elongated opening 66. A similar opening 78 is provided in the platen 50 adjacent the rear edge thereof, and that opening is intermediate the elongated opening 72 and the flange 74. The platen 50 terminates in a downwardly-inclined trailing edge 80. A notch 82 is formed in the trailing edge of the platen 50, and that notch extends inwardly beyond the downwardly-inclined trailing edge 80 of that platen. Similarly, a notch 84 is formed in the trailing edge of the platen 50, and that notch extends inwardly beyond the downwardly-inclined trailing edge 80.

An opening 55 is formed in the platen 50 adjacent the front end of that platen. That opening is closely adjacent the wall portion 52, and it is circular in plan.

A vertical plate 46, which has a foot-like flange, is secured to the lower face of the platen 50 by that flange. Spot welds can be used to secure that foot-like flange to the lower face of that platen. In addition, the plate 46 has an ear 47, and that ear will be suitably secured to the platen 50. Similarly, a vertical plate 48, which has a foot-like flange, is secured to the lower face of the platen 50 by that foot-like flange. In addition, the plate 48 has an ear 49, and that ear is suitably secured to the platen 50. The ears 47 and 49 are spaced forwardly of the forward ends of the foot-like flanges on the plates 46 and 48, respectively; and those ears rigidly secure the forward ends of those plates to the platen 50. The foot-like flanges on the plates 46 and 48, are shorter than those plates, as indicated particularly by FIG. 8. The plates 46 and 48 are parallel to each other, and they abut the adjacent edges of the elongated openings 66 and 72. The plates 46 and 48 are shorter than the elongated openings 66 and 72; and those plates terminate short of the notches 82 and 84, respectively.

A short vertical plate 75 has a foot 77; and that foot is secured to the platen 50 by a fastener, such as a machine screw. The plate 75 is alined with the vertical plate 48; but it is spaced a short distance rearwardly of the trailing edge of that plate. The plate 75 extends to the rear edge of the platen 50. A short vertical plate 79 has a foot 81; and that foot is secured to the platen 50 by a fastener, such as a machine screw. The plate 79 is alined with the vertical plate 46; but it is spaced a short distance rearwardly of the trailing edge of that plate. The plate 79 extends to the rear edge of the platen 50. The space defined by the confronting edges of the plates 48 and 75 is in register with the space defined by the confronting edges of the plates 46 and 79.

A securing flange 86 is provided at the front of the plate 46, and a securing flange 88 is provided at the front of the plate 48. As indicated particularly by FIG. 8, those securing flanges are suitably secured to the rear face of the vertical wall portion 52 of the platen 50. The vertical plates 75 and 79 are secured to the U-shaped bracket 44 on the rear plate 42, as by fasteners 90; and since the plates 75 and 79 are fixedly secured to the platen 50, the securement of those plates to the bracket 44 fixedly secures that platen 50 to the rear plate 42. The wall portion 52 at the front of the platen 50 is rigidly secured to the front plate 36 and to the U-shaped plate 34 by suitable fasteners.

The numeral 94 generally denotes a horizontal platen that is substantially identical to the horizontal platen 50. The platen 94 has a wall portion 96 at the front thereof; but instead of extending downwardly from the plane of that platen, that wall portion extends upwardly from that plane. The wall portion 96 has a vertical flange 98 at one side thereof, has a centrally-located rectangular opening 100 extending downwardly from the upper edge thereof, and has a vertical flange 102 at the other side thereof. The flanges 98 and 102 act to stiffen the wall portion 96 of platen 94. The platen 94 has a flange 104 which extends upwardly from one of the elongated sides thereof; and that flange is contiguous with the vertical flange 98. The flange 104 extends toward the rear of the platen 94, but it terminates at a point indicated by the numeral 105. An elongated opening 106, identical to the elongated opening 72, is formed in the platen 94; and that opening will be set in register with the elongated opening 66. An elongated slot 108, which is identical to the elongated slot 68 in the platen 50, will be set in register with that elongated slot. An opening 110 is provided in the platen 94; and that opening is identical to, and will be set in register with, the opening 70 in the platen 50. A second elongated opening 112 is formed in the platen 94, and that opening is identical to the opening 66; and that opening will be set in register with the opening 72 in the platen 50. A flange 114 is formed at the other elongated side of the platen 94, and that flange extends upwardly to the level of the upper edge of the flange 104. That flange is contiguous with the vertical flange 102 on the wall portion 96, and it extends almost all the way to the rear edge of the platen 94. The flanges 104 and 114 reinforce and stiffen the platen 94. Openings 116 and 118 are provided in the platen 94 adjacent the rear thereof, and those openings are identical to the openings 76 and 78 in the platen 50. The opening 116 is in register with the opening 76 and the opening 118 is in register with the opening 78. The platen 94 is provided with an upwardly-inclined trailing edge 120; and notches 122 and 124 extend inwardly through that trailing edge and into the horizontally-directed portion of the platen 94.

An opening 123 is formed in the platen 94 adjacent the front end of that platen. That opening is closely adjacent the wall portion 96, and it is circular in plan.

The numeral 126 denotes a vertical plate which has a foot-like flange, and that flange is secured to the upper face of the platen 94. That plate also has an ear and a securing flange, not shown, that are identical to the ear 49 and the securing flange 88 of the vertical plate 48. The numeral 130 denotes a second vertical plate which has a foot-like flange; and that flange also is secured to the upper face of the platen 94. That plate has an ear and a securing flange, not shown, that are identical to the ear 47 and the securing flange 86 of the vertical plate 46. The vertical plates 126 and 130 are disposed in parallel to each other, and they abut the adjacent edges of the elongated openings 106 and 112, respectively, in the platen 94. The vertical plates 126 and 130 are shorter than the elongated openings 106 and 112; and those plates terminate short of the notches 122 and 124, respectively.

A short vertical plate 128 has a foot formed on it; and that foot is secured to the platen 94 by a fastener, such as a machine screw. The plate 128 is alined with the vertical plate 126; but it is spaced a short distance rearwardly of the trailing edge of that plate. The plate 128 extends to the rear edge of the platen 94. A short vertical plate 132 has a foot formed on it; and that foot is secured to the platen 94 by a fastener, such as a machine screw. The plate 132 is alined with the vertical plate 130; but it is spaced a short distance rearwardly of the trailing edge of that plate. The plate 132 extends to the rear edge of the platen 94. The space defined by the confronting edges of the plates 126 and 128 is in register with the space defined by the confronting edges of the plates 130 and 132.

The securing flanges at the leading edges of the vertical plates 126 and 130 are suitably secured to the rear face of the vertical wall portion 96 of the platen 94. That vertical wall portion is suitably secured to the front plate 36 and to the arms of the U-shaped plate 34 by suitable fasteners; and hence the platen 94 and the vertical plates 126 and 130 thereon are fixedly secured to the front plate 36. Fasteners 135 secure the short vertical plates 128 and 132 to a U-shaped bracket 134 that is spot welded to the front face of the rear plate 42. In this way the platen 94 and the short vertical plates 128 and 132 thereon are fixedly secured to the rear plate 42.

The platens 50 and 94 fixedly and rigidly hold the upper end of the rear plate 42 in spaced relation to the front plate 36. In doing so, they coact with the base 30 to provide a light-weight but rigid frame for the bill-transporting device of FIG. 1. To minimize the flow of magneto-electric currents through that frame, the platens or the front plate or the rear plate or the base should be made of a non-magnetic material.

The rear plate 42 has a generally H-shaped opening 136 therein. However, the cross bar of that opening extends outwardly beyond the vertical portions of that opening, as shown particularly by FIG. 13. That cross bar is dimensioned to accommodate an inserted bill when that bill is moved through that cross bar in a direction which is parallel to the elongated axis of that bill. The cross bar of the H-shaped opening 136 in the rear plate 42 is in direct alinement with the opening 38 in the front plate 36; and that cross bar and the opening 38 are in register with the space intermediate the upper surface of platen 50 and the lower surface of platen 94.

The numeral 138 denotes a guide plate which is mounted intermediate the upper surface of platen 50 and the lower surface of platen 94. That guide plate is as long as the platens 50 and 94, but it is much narrower. Specifically, the guide plate 138 is narrower than that portion of the platen 50 which is intermediate the elongated opening 72 and the flange 74. One of the elongated sides of the guide plate 138 is in register with that side of platen 50 which has the flange 74 thereon; and the other elongated side of that guide plate is spaced from the adjacent edge of the elongated opening 72. An opening 139 is provided in the guide plate 138, and that opening is in register with the openings 78 and 118 in the platens 50 and 94, respectively; all as shown by FIG. 10. A second guide plate 140, which is identical to the guide plate 138, is also disposed intermediate the upper surface of the platen 50 and the lower surface of the platen 94. That guide plate has one of the elongated sides thereof in register with that side of the platen 50 which has the horizontal flange 64 thereon, and that guide plate has the other elongated side thereof spaced from the opening 66. The confronting elongated sides of the guide plates 138 and 140 are spaced apart a distance just slightly greater than the height of a bill. The guide plate 140 has an opening 141 therein, and that opening is in register with the openings 76 and 120 in the platens 50 and 94, respectively; all as shown by FIG. 10.

The space between the confronting edges of the vertical plates 126 and 128 and the space between the confronting edges of the vertical plates 130 and 132 are spanned by a U-shaped plate 146. That U-shaped plate abuts the confronting faces of the plates 126 and 130 and also abuts the faces of the plates 128 and 132; and that U-shaped plate is fixedly secured to those plates by fasteners, such as screws and nuts. That U-shaped plate helps hold the plate 128 in alinement with the plate 126 and helps hold the plate 132 in alinement with the plate 130.

The space between the confronting edges of the plates 48 and 75 and the space between the confronting edges of the plates 46 and 79 are spanned by a heavy-walled gear housing 142; all as shown by FIG. 10. That gear housing abuts the confronting faces of the plates 48 and 46 and also abuts the faces of the plates 75 and 79; and that gear housing is fixedly secured to those plates by fasteners, such as machine screws. That gear housing helps hold the plate 75 in alinement with the plate 48 and helps hold the plate 79 in alinement with the plate 46. The sides of that gear housing have openings 143 therein, and the bottom of that housing has an opening 144 therein.

The numeral 148 denotes a J-shaped bracket which has a frusto-triangular closed end; and the short arm of that bracket is at the widest portion of that closed end. Similar J-shaped brackets are denoted by the numerals 150, 152 and 154. Each of the J-shaped brackets 148, 150, 152 and 154 has horizontal slots 156 in the short arm thereof, and those slots are parallel to the closed ends of those brackets. The long arms of the J-shaped brackets 148, 150, 152 and 154 have vertically-directed notches 158 therein, as shown particularly by FIG. 16. The horizontal slots 156 in the short arms of the J-shaped brackets 148 and 150 accommodate the fasteners that secure the U-shaped plate 146 to the plates 126, 128, 130 and 132. The horizontal slots in the short arms of the J-shaped brackets 152 and 154 accommodate the fasteners which secure the gear housing 142 to the plates 46, 48, 75 and 79. The horizontal slots 156 permit limited movement of the J-shaped brackets 148, 150, 152 and 154 relative to the vertical plates 46, 48, 75, 79, 126, 130 and 132 to permit the vertically-directed notches 158 of those brackets to be placed in register with the spaces defined by the confronting ends of plates 48 and 75, of plates 46 and 79, of plates 126 and 128, and of plates 130 and 132. The long arms of the J-shaped brackets 148 and 150 extend toward but terminate short of the upper surface of platen 94, and the long arms of the J-shaped brackets 152 and 154 extend toward but terminate short of the lower surface of the platen 50. Suitable bushings 160 are mounted within the notches 158 of the J-shaped brackets 148, 150, 152 and 154; and the bushings 160 in the notches of J-shaped brackets 148 and 150 rotatably support a shaft 162. Timing belt pulleys 164 are fixedly secured to that shaft, and those pulleys will be in register with the elongated openings 106 and 112 in the platen 94. A spur gear 166 is fixedly secured to one end of the shaft 162; and a ratchet-faced clutch member 168 is secured to the shaft 162 intermediate the other end of that shaft and the bushing 160 which supports that other end of that shaft. A ratchet-faced clutch member 170 rotates freely on the shaft 162, and the ratchet-face of that clutch member confronts and can engage the ratchet face of the clutch member 168. A large diameter pulley 172 is mounted on and supported by the shaft 162, adjacent the said other end of that shaft; but that pulley is free to rotate relative to that shaft. A knurled hand wheel 174 is fixedly secured to the said other end of the shaft 162, and that hand wheel can be used to effect rotation of the shaft 162 whenever desired. A helical spring 176 is telescoped over the said other end of the shaft 162, and one end of that spring is seated in a socket in the clutch member 170 while the other end of that spring is seated in a socket in the large diameter pulley 172. That spring is wound in such a way that it will tend to wind tightly if the large diameter pulley 127 is held stationary while the shaft 162 rotates in the counter clockwise direction in FIG. 2.

The numeral 178 denotes a shaft which is held by the bushings 160 that are disposed within the vertical notches 158 of the J-shaped brackets 152 and 154. That shaft is located below the level of, and in vertical registry with, the shaft 162; and that shaft extends through the openings 143 in the gear housing 142. The shaft 178 has timing belt pulleys 180 fixedly secured thereto, and those pulleys are in register with the elongated openings 66 and 72 in the platen 50. A spur gear 182 is mounted on one end of the shaft 178, and that gear meshes with the spur gear 166 on the one end of the shaft 162. A worm wheel 184 is mounted on the shaft 178, and that gear is disposed within the gear housing 142. That worm wheel meshes with, and is driven by, a worm gear 186 which is mounted on the shaft of a motor 188. That motor shaft is vertically directed, and it extends upwardly through the opening 144 in the bottom of the gear housing 142. The motor 188 is suitably secured to, and it depends downwardly from, the gear housing 142. That motor is long enough to extend down into the large opening 31 in the base 30, but it is short enough so it does not extend down below the level of the lower edges of the flanges on that base.

The motor 188 is a reversible motor; and it is preferably a two phase motor. A capacitor 190 is connected in series with the phase winding of motor 188, and that capacitor is mounted on a bracket adjacent the motor 188. That bracket is secured to, and depends downwardly from, the vertical plates 46 and 48. That bracket also supports a multi-prong connector 195; and the various electrical components of the bill-transporting device of FIG. 1 are connected to appropriate prongs of that connector.

The numeral 191 denotes a U-shaped bracket which is disposed between the vertical plates 46 and 48 on the platen 50; and the arms of that bracket abut the confronting faces of those plates. As shown by FIG. 3, that bracket is close to the front plate 36; and that bracket supports bushings which accommodate a horizontally-directed pivot 192. That pivot has timing belt pulleys 194 rotatably mounted thereon, and those pulleys are in register with the elongated openings 66 and 72 in the platen 50.

The numeral 196 denotes a U-shaped bracket which is disposed between the vertical plates 126 and 130; and that bracket is narrower than the space between those plates. A pivot 198 extends between and is supported by the vertical plates 126 and 130; and that pivot extends through the arms of the U-shaped bracket 196. As a result, that bracket can rotate about that pivot and thus can rotate relative to the plates 126 and 130. A pivot 200 extends between and is secured to the vertical plates 126 and 130 at a point above the top of the bracket 196; and springs 203 are wound around the pivot 198 and have the upper ends thereof bearing against the pivot 200 while having the lower ends thereof bearing against the closed end of the bracket 196. Those springs bias the bracket 196 for rotation in the counter clockwise direction in FIGS. 3 and 4 and thus bias that bracket toward the lowered position shown by FIG. 4. However, those springs can yield to permit the U-shaped bracket 196 to rotate to the raised position shown by FIG. 3.

The leading edges of the U-shaped brackets 191 and 196 are cut-away where those leading edges are adjacent the openings 55 and 123. As a result light can pass uninterruptedly through the openings 55 and 123 until a bill is inserted between the platens 50 and 94.

The bracket 196 carries bushings which support an elongated pivot 202. The ends of that pivot extend through openings in the vertical plates 126 and 130; and those openings are considerably larger than the diameter of the pivot 202. As a result, the U-shaped bracket 196 can rotate a limited number of degrees about the pivot 198 without having the pivot 202 engage the openings in the plates 126 and 130.

The bushings which are carried by the U-shaped bracket 196 also support a U-shaped bracket 206. The latter bracket is narrower than the bracket 196; and hence the bracket 206 can be disposed between the arms of the bracket 196. The bracket 206 rotates about the pivot 202 and thus can rotate relative to the bracket 196; and the bracket 206 can have the righthand edge of the bottom thereof abutting the closed end of bracket 196; as shown by FIG. 3, or can have that righthand edge disposed a short distance above that closed end, as shown by FIG. 4. Whenever the bracket 206 has the righthand edge of the bottom thereof disposed a short distance above the closed end of the bracket 196, the springs 203 will move the bracket 196 into the lowered position shown by FIG. 4. However, when the righthand edge of the bottom of the bracket 206 is in engagement with the closed end of the bracket 196, and when the bracket 206 is then rotated in the clockwise direction, the bracket 196 will be moved to the raised position shown by FIG. 3. As a result, the bracket 206 can be used to effect raising of the lefthand end of the bracket 196, and thus to effect the raising of the pivot 202. The U-shaped bracket 206 has an upwardly-projecting arm 207 and that arm can be moved to the right in FIG. 4 to rock the brackets 206 and 196 from the positions shown in FIG. 4 to the positions shown by FIG. 3.

Timing belt pulleys 204 are rotatably mounted on the outer ends of the pivot 202; and those pulleys will move up and down as the brackets 206 and 196 raise and lower the pivot 202. The pulleys 204 are mounted in register with the elongated openings 106 and 112 in the platen 94.

The numeral 210 denotes a mounting bracket that is secured to, but is laterally spaced from, the vertical plate 126; and that mounting plate projects upwardly above the top of the plate 126. A horizontally-directed pivot 212 is supported by the mounting bracket 210; and a lever 224 is rotatably mounted on that pivot. A connecting rod 214 extends between the upwardly-extending arm 207 of the bracket 206 and the lower end of the lever 224; and pin joints 216 and 218 connect that rod with that upwardly-projecting arm and with that lever, respectively. The connecting rod 214 extends to the right beyond the lower end of the lever 224, as shown particularly by FIG. 2; and the right-hand end of that rod has an opening in which one end of a helical extension spring 222 is hooked. The other end of that spring is hooked around a pin 220 which is secured to the mounting bracket 210.

The lever 224 has a slot 226 in the upper end thereof, and that slot accommodates a pin which is carried by the plunger 228 of a solenoid 230. That solenoid is suitably secured to and supported by the mounting bracket 210; and that solenoid can be energized to retract the plunger 228 and thereby rotate the lever 224 a distance in the clockwise direction in FIG. 2. A switch 232 is suitably secured to the mounting bracket 210; and the actuator 234 of that switch extends into a hole in the connecting rod 214.

The spring 222 normally holds the connecting rod 214, the lever 224, and the plunger 228 in the positions shown by FIG. 2; and, in doing so, that spring normally holds the bracket 206 in the position shown by FIG. 3. This means that under normal conditions the spring causes the bracket 206 to hold the bracket 196 and the pivot 202 in their raised positions. The force of the spring 222 will be overcome by the solenoid 230 whenever the latter is energized; and hence that solenoid can cause the bracket 206 to rotate to the position shown by FIG. 4. As that bracket so rotates, it will enable the springs 208 to lower the bracket 196 and the pivot 202 to the positions shown by FIG. 4. The energization of the solenoid 230 will also cause the connecting rod 214 to move the actuator 234 far enough to close the contacts of the normally-open switch 232.

The numeral 236 denotes a bracket which is secured to, and which spans the space between, the vertical plates 126 and 130. That bracket has downwardly depending legs 238 which are spaced apart; and those legs have slots 240 therein. Those slots accommodate projections 243 on a mounting 242 for a magnetic head 244; and those slots and those projections guide the vertical movement of that mounting. A helical compression spring 246 biases the mounting 242, and thus the magnetic head 244, downwardly relative to the bracket 236; and hence that spring biases that head downwardly relative to the platen 94. However, the spring 246 can yield to permit upward movement of the mounting 242 and of the magnetic head 244. An adjusting screw 248 has the shank thereof passing through a threaded opening in the bracket 236, through the spring 246, and through an opening in the mounting 242. A washer is secured to the lower end of the screw 248; and that washer prevents accidental separation of the mounting 242 from the screw 248. A nut 250 is carried by the adjusting screw 248, and that nut can be used to lock that screw in position relative to the bracket 236. However that nut can be loosened to permit rotation, and thus vertical movement, of the screw 248 relative to the bracket 236. That vertical movement fixes the normal position of the magnetic head 244 relative to the platen 94.

The numeral 252 denotes a socket which can receive a connector that will serve to connect the magnetic head 244 into a suitable circuit. That socket is mounted on the bracket 236, and it is connected to the magnetic head 244 by two short wires. Those wires are readily flexible so they can permit movement of the magnetic head 244 relative to the platen 94.

The numeral 260 generally denotes a bracket that is L-shaped in configuration, as shown by FIG. 6. That bracket has a long horizontally-directed arm and has a short vertically-directed arm; and both of those arms have openings therein. The horizontally-directed arm also has leading and trailing edges 264 that incline upwardly from the plane of that arm. A hardened face plate 268 is suitably secured to the horizontally-directed arm of the bracket 260; and that hardened face plate is strongly resistant to wear. That face plate underlies part of that horizontally-directed arm and also underlies the upwardly inclined leading and trailing edges 264. That face plate also has a downwardly depending lip 266; and that lip will confront the innermost edge of one of the timing belts used in the bill-transporting device of FIG. 1.

A number of L-shaped brackets 260 are provided; and the long arms of those brackets are secured to the platens 94 and 50, and the short arms of those brackets are secured to the vertical plates 126, 130, 46 and 48. As indicated particularly by FIG. 1, the brackets 260 which are secured to the platen 94 are grouped in pairs that are spaced along the length of that platen, and the brackets of each pair are set opposite each other. Similarly, the brackets 260 which are secured to the platen 50 are grouped in pairs that are spaced along the length of that platen, and the brackets of each pair are set opposite each other. However, the pairs of brackets 260 which are secured to the platen 94 are displaced from the pairs of brackets 260 which are secured to the platen 50, all as shown by FIG. 5.

The numeral 270 denotes timing belts which extend around and are supported by the timing belt pulleys 204 and 164. The numeral 272 denotes timing belts which extend around and are supported by the timing belt pulleys 194 and 180. The timing belts 270 are mounted so the ribs thereon engage and pass under the hardened face plates 268 of the brackets 260 which are supported by the platen 94. The timing belts 272 are mounted so the ribs thereon engage and pass over the hardened face plates 268 of the brackets 260 which are supported by the platen 50. The hardened face plates 268 of the brackets 260 carried by the platen 50 define a horizontally-directed plane, and the hardened face plates 268 of the brackets 260 carried by the platen 94 define a second horizontally-defined plane; and the vertical distance between those two planes is less than twice the thickness of any of the timing belts 270 and 272. As a result, the timing belts 270 and 272 must bow downwardly to pass under the hardened face plates 268 of the brackets 260 secured to the platen 94 and must bow upwardly to pass over the hardened face plates 268 of the brackets 260 secured to the platen 50. The downward and upward bowing of the timing belts will alternate and will force those belts to undulate as they move relative to the platens 50 and 94. This undulation is very desirable because it recurrently forces the confronting faces of the timing belts 270 and 272 into intimate engagement with a bill interposed between those faces. If desired, rollers could be used instead of the brackets 260. However, while rollers would reduce the frictional forces applied to the timing belts 270 and 272, those forces have not been found to be particularly objectionable.

The timing belts 270 and 272 will be driven by the timing belt pulleys 164 and 180 mounted on the shafts 162 and 178, respectively. The shaft 178 will be directly driven by the motor 188, and the spur gears 182 and 166 will enable that shaft to drive the shaft 162. The gears 182 and 166 are important in keeping the belts 270 and 272 moving in synchrony with each other.

The numeral 274 denotes a switch that has an arcuate actuator 276. That switch is secured to the platen 50 adjacent the front of that platen, and the actuator of that switch extends upwardly into the openings 72 and 112. In doing so, that actuator extends into the path of movement of any bill that is inserted within the bill-transporting device of FIG. 1. The actuator 276 is immediately adjacent the belts 272 and 270 which are disposed within the openings 72 and 112, and hence the portion of the leading edge of the inserted bill which engages that actuator will be fully and completely supported by those belts. As a result, that portion of that leading edge will be able to resist any tendency to crumple or roll up as it engages and moves the actuator 276. The actuator 276 extends toward the wall portions 52 and 96, respectively, of the platens 50 and 94; and, consequently, that actuator will be engaged and moved by an inserted bill almost as soon as the leading edge of that bill passes inwardly beyond those wall portions.

The numeral 278 denotes a switch that has an arcuate actuator 280. That switch is secured to the platen 94 adjacent the front of that platen; and the actuator of that switch extends downwardly into the openings 106 and 66. In doing so, that actuator extends into the path of movement of any bill that is inserted within the bill-transporting device of FIG. 1. The actuator 280 is immediately adjacent the belts 270 and 272 which are disposed within the openings 106 and 66; and hence the portion of the leading edge of the inserted bill which engages that actuator will be fully and completely supported by those belts. The actuator 280 extends toward the wall portions 52 and 96 of the platens 50 and 94 and will thus be engaged by an inserted bill almost as soon as the leading edge of that bill passes inwardly beyond those wall portions. The actuator 276 of the switch 274 and the actuator 280 of the switch 278 will be engaged by an inserted bill at about the same time where that inserted bill is intact and the corners thereof are not folded. However, if a corner of the inserted bill has been torn off or has been folded, one of those actuators will be engaged and moved before the other actuator is engaged and moved. To make certain that the presence of an inserted bill is sensed promptly, the switches 274 and 278 are connected in parallel, as shown by FIG. 18. This means that a closed circuit will be established almost as soon as the inserted bill passes inwardly beyond the wall portions 52 and 94, respectively, of the platens 50 and 94; and that closed circuit will be established by one or the other or both of switches 274 and 278.

The numeral 282 denotes a switch that has an arcuate actuator 284. That switch is secured to the platen 50 about one quarter of the distance toward the rear of that platen, and the actuator 284 extends upwardly into the openings 106 and 66. That actuator is immmediately adjacent the belts 270 and 272 which are disposed within those openings, and those belts will give full and complete support to the leading edge of any inserted bill. The actuator 284 extends rearwardly; and that actuator is thus, in part at least, disposed rearwardly of the actuator 280.

The numeral 286 denotes a switch that has an arcuate actuator 288. That switch is secured to the platen 50 at a point about one half of the distance toward the rear of that platen, and the actuator 288 extends upwardly into the openings 112 and 72. That actuator is immediately adjacent the belts 270 and 272 which are disposed within those openings, and those belts will give full and complete support to the leading edge of any inserted bill. The actuator 288 extends forwardly toward the front plate 36; and an inserted bill will engage that actuator while that bill is still engaging and holding the actuators 276 and 280 of the switches 274 and 278.

The numeral 290 denotes a switch that has an arcuate actuator 292. That switch is secured to the platen 50 at a point which is just a little further toward the rear of that platen than is the point at which the switch 286 is secured to that platen. The actuator 292 extends upwardly into the openings 106 and 66, and it extends rearwardly from that switch. That actuator is immediately adjacent the belts 270 and 272 which are disposed within the openings 106 and 66, and those belts will give full and complete support to the leading edge of any inserted bill.

The numeral 294 denotes a switch that has an arcuate actuator 296. That switch is secured to the platen 50 adjacent the rear of that platen, and the actuator of that switch extends into the openings 106 and 66. The actuator 296 extends rearwardly toward the rear of the platen 50, and it extends between the shafts 162 and 178. That actuator is immediately adjacent the belts 270 and 272 which are disposed within the openings 106 and 66, and those belts will give full and complete support to the leading edge of any inserted bill.

The numeral 298 denotes a switch that has an arcuate actuator 300. That switch is secured to the platen 94 adjacent the rear of that platen, and the actuator of that switch extends into the openings 112 and 72. The actuator 300 extends rearwardly toward the rear of the platen 94, and it extends between the shafts 162 and 178. That actuator is immediately adjacent the belts 270 and 272 which are disposed within the openings 112 and 72, and those belts will give full and complete support to the leading edge of any inserted bill.

The actuators 296 and 300 are opposite each other, and they will be engaged by the leading edge of an inserted bill at about the same time. Further, those actuators extend as close to the rear edges of the platens 50 and 94 as is practicable; and hence an inserted bill will hold those actuators in moved position until that bill has passed almost all the way through the opening 136 in the rear plate 42.

The arcuate actuators 276, 280, 284, 288, 292, 296 and 300 are bent to have large radii of curvature. Such large radii are desirable for two reasons: first, they enable those actuators to simulate shallow inclined planes and thus enable those actuators to move easily when they are engaged by the leading edge of an inserted bill; and second, they enable each of those actuators to maintain contact with the inserted bill throughout an appreciable portion of the path of movement of that bill.

Stops 302 are provided for some of the switch actuators, and those stops will be secured to the vertical plates 46, 48, 126 and 130 by machine screws or other suitable fasteners. Those stops will limit the extent to which those actuators project through the openings 66, 72, 106 and 112. Those stops have slots 304 therein, and those slots permit adjustments in the positions of those stops relative to the vertical plates 66, 72, 106 and 112. As a result, those stops facilitate the making of adjustments in the normal positions of the switch actuators.

The numeral 306 denotes a bearing bracket which is secured to the platen 94 adjacent the rear of that platen. That bracket is intermediate the opening 118 and the upwardly inclined trailing edge 120 of that platen. That bearing bracket suitably supports a bushing 310 which accommodates and rotatably supports one end of a shaft 308. A bushing 312 is carried by the vertical plate 128, and that bushing rotatably supports the other end of the shaft 308. That shaft has soft-faced rollers 314 fixedly secured thereto, and those rollers rotate with that shaft. The soft-faced rollers are immediately adjacent the outer faces of the vertical plates 126 and 130; and parts of those rollers extend into the opening 136. A small diameter pulley 316 is fixedly secured to and rotatable with the shaft 308, and that pulley is in alinement with the large diameter 172 that is loosely mounted on and carried by the shaft 162. An endless belt 318 extends around and is supported by the large diameter pulley 172 and by the small diameter pulley 316.

The vertical plates 75 and 79 support bushings 317, and those bushings rotatably support a shaft 319. That shaft is located below the level of, and is in vertical registry with, the shaft 308. Soft-faced rollers 321 are secured to and rotatable with the shaft 319; and those rollers engage and are driven by the soft-faced rollers 314 which rotate with the shaft 308. The diameters of the soft-faced rollers 314 and 321 are so large that the confronting faces of those rollers always abut and slightly deform each other.

The numeral 320 denotes a U-shaped bracket which is disposed between, and is secured to, the plates 46 and 48; and that bracket is disposed adjacent the front ends of those plates. A pivot 322 is supported by that bracket, and a carrier 323 is rotatably mounted on that pivot. That carrier is generally U-shaped; and that carrier supports a pivot 324. A soft-faced roller 326 is rotatably mounted on that pivot, and that soft-faced roller can be moved toward and away from the bottom face of the magnetic head 244 by appropriate rotation of the carrier 323.

A pin joint 328 is provided at the bottom of the carrier 323, and that pin joint is connected to one end of a connecting rod 334. The other end of that connecting rod is secured to the plunger 332 of a solenoid 330. That solenoid is fixedly secured to a small plate 331 which, in turn, is fixedly secured to the vertical plate 148; and the plate 331 extends downwardly from the plate 48.

The numeral 336 denotes a horizontal platform which projects outwardly from the front face 36 of the currency identification device, and that platform serves to support a bill which is to be tested by that device. A bracket 338 of attractive appearance surrounds and helps support the platform 336; and the upper edges of that bracket project upwardly beyond the upper face of that platform. Those edges help a patron aline a bill with the opening 38 in the front plate 36, and they also make certain that the patron will move the leading edge of that bill far enough through that opening to be intermediate the leading edges of the belts 270 and 272.

The numeral 370 denotes a gate which is generally flat but which has a horizontally-directed ear 372 adjacent the top thereof. That gate is thinner than the U-shaped plate 34, and that gate is narrower than the horizontal distance between the upstanding arms of that plate. As a result, that gate can fit within the space defined by the arms and by the closed end of the U-shaped plate 34. The wall portion 96 of the platen 94 overlies part of the rear face of that gate but does not obstruct movement of that gate; and the front plate 36 overlies substantially all of the front face of that gate but does not obstruct movement of that gate. As a result, the gate 370 is held in a vertical position by, but is free to move vertically relative to, the front plate 36 and the wall portion 96 of the platen 94.

The gate 370 has an opening 374 therein, and that opening is made wide enough to accommodate a bill when that bill has its long axis perpendicular to the plane of that gate. That opening will normally be set in register with the opening 38 in the front plate 36, as shown by FIG. 14; but that opening can be moved downwardly out of register with the opening 38, as shown by FIG. 15. A switch 362 is mounted on the platen 94 adjacent the front of that platen, and the actuator 364 of that switch extends to, and is hooked through, an opening in the ear 372 on the gate 370. Whenever the gate 370 is in the raised position shown by FIG. 14, the movable contact of that switch will engage the left-hand fixed contact of that switch, as shown by FIG. 18; but whenever that gate is in the lowered position shown by FIG. 15, that movable contact will engage the right-hand fixed contact of that switch.

A solenoid 344 is supported on and carried by the mounting bracket 210; and, as shown by FIG. 1, that solenoid is at one face of that bracket while the switch 232 is at the other face of that bracket. The plunger 346 of the solenoid 344 is disposed adjacent the upper end of a rocker arm 350 which is rotatably supported by a pivot 348 that is carried by the mounting bracket 210. The upper end of that rocker arm is rotatably secured to the plunger 346 by a pin joint 349; and the lower end of that rocker arm is secured to one end of a connecting rod 352 by a pin joint 351.

The other end of that connecting rod is connected to an ear on a bracket 354 by means of a pin joint 355. That bracket is rotatably mounted on the pivot 200 which is held by the vertical plates 126 and 130; and that bracket has an extension 353 which underlies the ear 372 on the gate 370. A helical extension spring 356 has one end thereof hooked through an opening in the bottom of the rocker arm 350 and has the other end thereof hooked around a pin 357 that is secured to the mounting bracket 210. The spring 356 urges the rocker arm 350 for rotation in the counter clockwise direction, and also urges the connecting rod 352 for movement to the right, in FIG. 2. Such movement of that connecting rod will rotate the U-shaped bracket 354 to the dotted-line, raised position of FIG. 15. However, that sping can yield to permit that bracket to move to the solid-line, lowered position in FIG. 15. When the bracket 354 is in its raised position it will hold the ear 372 of the gate 370 up against the adjustable stop 360, shown in the form of a machine screw. That stop is suitably held by a bracket 361 which is secured to and supported by the vertical plate 130. A nut 363 can be tightened against the bracket 361 to prevent rotation of the stop 360, and thus prevent accidental shifting of the vertical position of that stop. When the bracket 354 is in its lowered position, the gate 370 will be free to move downwardly and sense for the presence or absence of a thread, tape or other member attached to the inserted bill.

The bracket 361 is L-shaped, and it has an opening in the horizontally-directed position at the top thereof. That opening is in vertical registry with the openings 55 and 123, respectively, in the platens 50 and 94; and it also is in vertical registry with the cut-away portions of the U-shaped brackets 191 and 196. Further, that opening will be in vertical registry with a cut-away portion of the ear 372 on the gate 370 and with a cut-away portion of the extension 353 on the bracket 354. A lamp 366 is mounted within the opening in the bracket 361, and a light sensitive cell 368 is mounted below, but in registry with the opening 55 in platen 50. As a result, the light beam from that lamp will normally strike that light sensitive cell. That cell is of the type which constitutes a low resistance when light is striking it, but that constitutes a high resistance when light does not strike it.

The numeral 426 in FIG. 19 denotes a unit which includes a tuned amplifier and a control element; and that unit can be identical to the similarly-numbered unit disclosed in copending Smith et al. application Serial No. 849,066 for Currency Detectors which was filed on October 27, 1959. The numeral 428 denotes the coil of a relay that has contacts 438, 439 and 440, the numeral 446 denotes the coil of a relay that has contacts 442 and 444, the numeral 462 denotes the coil of a relay that has contacts 454, 456, 458 and 460, and the numeral 476 denotes the coil of a relay that has contacts 470, 472 and 474. Those relays are part of a relay chain which is similar to a relay chain, in the said copending Smith et al. application, that has similarly-numbered relays. The numeral 520 denotes the coil of a relay that has contacts 522, 524 and 526, the numeral 528 denotes the coil of a relay that has contacts 530, 532 and 534, the numeral 544 denotes the coil of a relay that has contacts 550, 552, 554, 556, 558, 560, 562, 564 and 566, and the numeral 578 denotes the coil of a relay that has contacts 584, 586 and 588. The parts of the circuit shown in FIGS. 18 and 19 are interconnected by the conductors 452, 490, 436, 434, 429, 594, 496, 500, 498, 604, 596, 592 and 602. Those parts of the circuit can be connected to a suitable source of A.C. voltage by the plug 410 which has prongs 412 and 414.

The numeral 380 denotes a step-down transformer that provides low voltage for the lamp 366. The terminals of the primary winding of that transformer are connected to the conductors 488 and 450 in FIG. 18 by conductors 453 and 451, respectively. Since both of those conductors are directly connected to the prongs of the plug 410, the lamp 366 will be energized whenever that plug is held within an appropriate electrical socket.

The numeral 382 denotes the coil of a relay, and that coil can be energized to open a pair of normally-closed contacts 384. One of those contacts is connected to conductor 436 by conductor 628 while the other of those contacts is connected to conductor 594. A conductor 402 has one end thereof connectable to one terminal of a source of D.C., and has the other end thereof connected to one terminal of the light-sensitive cell 368 by resistor 388 and relay coil 382. A conductor 404 can connect the other terminal of the light-sensitive cell 368 to the other terminal of that source of D.C. For convenience and simplicity, that source of D.C. can be the power supply for the unit 426 in FIG. 19. A Zener diode 386 is connected to the junction between resistor 388 and coil 382, and it is also connected to the conductor 404. That diode will maintain a desirable voltage across the coil 382 and the light-sensitive cell 368.

The numeral 624 denotes a time delay relay which has a pair of normally-closed contacts 606 and a stall-type motor. An actuator is mounted on the output shaft of that motor, and that actuator will respond to rotation of that output shaft to cause the contacts 606 to open. As that armature opens those contacts, it will be held against further rotation, and thereupon the motor will stall and will cause the armature to continue to hold the contacts 606 open as long as the motor is energized. When that motor is de-energized the output shaft of the motor, and the actuator mounted thereon, will be restored to normal position by a returning spring. In one preferred embodiment of the present invention, the motor of the relay 624 runs about thirty seconds before the actuator on the output shaft thereof opens the contacts 606. Such a length of time is many times longer than the normal time cycle of the bill-transporting device, and yet it is short enough to prevent undue running of the motor of that bill-transporting device. One commercially-available timer of this type is made by the Struthers Dunn Company.

Whenever the bill-transporting device shown in FIG. 1 is at rest, the spring 222 will pull the connecting rod 214 to the right, as shown by FIG. 3, and will thus cause the U-shaped bracket 206 to rotate the U-shaped bracket 196 to its raised position. As a result, whenever the bill-transporting device of FIG. 1 is at rest, the pivot 202 and the timing belt pulleys 204 thereon will be in raised position. This means that the leading edges of the timing belts 270 will be above, and out of engagement with, the leading edges of the timing belts 272; and this is desirable because it facilitates the ready introduction of a bill between those leading edges.

At this time, the spring 356 will pull the rocker arm 350 in the counter clockwise direction, and will thus pull the connecting rod 352 to the position shown by FIG. 2. That connecting rod will hold the U-shaped bracket 354 in the raised position shown by dotted lines in FIG. 15, and will thus hold the gate 370 in the raised position shown by dotted lines in FIG. 15. This means that the opening 374 in that gate will be alined with the opening 38 in the front plate 36 and will also be alined with the space between platens 50 and 94. As a result, a patron can easily introduce the leading edge of a bill through the openings 38 and 374 and into the space between the platens 50 and 94.

Also at this time, a spring within the solenoid 330 holds the plunger 332 of that solenoid in the extended position shown by FIG. 2. That plunger will act through the connecting rod 334 and through the carrier 323 to hold the soft-faced roller 326 below and out of engagement with the magnetic head 244. However, whenever that solenoid is energized, its plunger 332 will be retracted and will act through the connecting rod 334 and the carrier 323 to force the soft-faced roller 326 upwardly toward the magnetic head. That soft-faced roller is readily deformable by the forces exerted by the solenoid 330; and, as a result, that roller will force an inserted bill up against the face of the magnetic head 244 and will then deform itself to assume a concave configuration at the upper face thereof. This assumption of a concave configuration is desirable because it will bow the inserted bill around the face of the magnetic head; and that bowing action is important in assuring full registration of the bill with the air gap of that magnetic head, and in tending to smooth out wrinkles in the bill. The soft-faced roller 326 can rotate readily relative to the pivot 324, and that ready rotation will minimize the frictional drag which is applied to the inserted bill during the sensing of that bill.

Whenever the currency detector provided by the present invention is at rest, the electrical components of that currency detector will be in the positions shown by FIGS. 18 and 19. At such time, the terminal 412 of the plug 410 will be directly connected to the fixed contacts of the normally-open switches 274, 278 and 286 by conductors 452 and 450, to the movable contacts of the normally open contacts 470 and 472 adjacent relay coil 476 by conductor 452 and junctions 598 and 468, to the movable contact of the normally open contacts 586 adjacent the relay coil 578 by conductor 452 and junction 598 and conductor 480 and junction 481 and conductor 580, to one terminal of transformer 380 by conductors 452, 450 and 451, and to the movable contact of the normally-closed contacts 524 adjacent the relay coil 520 by the conductor 452, the junction 598, the conductor 480, the junction 481 and the conductor 432. The terminal 412 will be connected to the movable contact of the switch 290 by the conductor 452 and junction 598 and conductor 480 and junction 481 and conductor 432 and the normally-closed contacts 524 adjacent the relay coil 520 and conductor 434; and that terminal will be connected to the fixed relay contact 384 by the movable and upper fixed contacts of the switch 290 and by conductors 436 and 628. In addition, that terminal will be connected to the fixed contact 530 adjacent the relay coil 528 by conductor 452, junction 598, conductor 480, junction 481, conductor 432, contacts 524, conductor 434, the movable and upper fixed contacts of the switch 290 and conductor 436. The movable relay contact 384 will be connected to the terminal 414 of the plug 410 by conductor 594, rectifier 540, serially-connected resistor 538 and relay coil 528, junctions 542, 572, 582, and 590, and conductor 490.

At this time, a patron can readily insert the leading edge of a bill 400 between the leading edges of the upper and lower timing belts 270 and 272. The upstanding sides and end of the bracket 338 will help the patron effect proper placement of that bill. As the leading edge of that bill moves into register with the openings 55 and 123, respectively, in the upper and lower platens 50 and 94, it will interrupt the beam of light that normally passes from the lamp 366 to the light-sensitive cell 368. Thereupon, the resistance of that cell will increase to the point where the coil 382 will be unable to hold the relay contacts 384 apart; and those contacts will close and energize the relay coil 528 via conductor 452, junction 598, conductor 480, junction 481, conductor 432, contacts 524, conductor 434, the movable and upper fixed contacts of switch 290, conductors 436 and 628, now-closed relay contacts 384, conductor 594, rectifier 540, serially-connected resistor 538 and relay coil 528, junctions 542, 572, 582, and 590, and conductor 490. As current flows through the serially-connected resistor 538 and relay coil 528, the condenser 536 will become charged. The current will continue to flow through the serially-connected resistor 538 and relay coil 528 as long as any part of the bill is in register with the openings 55 and 123, respectively, in the platens 50 and 94, but after that bill has been moved far enough in the forward direction to move its trailing edge beyond those openings, the cell 368 will again receive light from the lamp 366 and the coil 382 will separate the relay contacts 384. Thereupon the condenser 536 will discharge through the serially-connected resistor 538 and relay coil 528 to keep that coil energized for a predetermined period of time. The duration of that period of time will be determined by the values of the resistor 538 and of the condenser 536; and that period of time will preferably be less than one half of a second. The overall result is that the relay coil 528 will be energized and will be kept energized for a short, but adequate period of time.

The energization of the relay coil 528 will enable that coil to shift the movable contact 532 down into engagement with the fixed contact 530. That shifting will energize the solenoid 230 via conductor 452, junction 598, conductor 480, junction 481, conductor 432, normally closed contacts 524, conductor 434, the movable and upper fixed contacts of switch 290, conductor 436, contacts 530 and 532, junctions 570 and 600, conductor 429, junction 482, normally-closed timer contacts 606, junction 484, solenoid 230, junction 486, conductor 488 and conductor 490. Thereupon the solenoid 230 will retract its plunger 228 and rotate the rocker arm 224 in the clockwise direction in FIG. 3, thereby shifting the connecting rod 214 toward the front plate 36. Such shifting of the connecting rod 214 will permit the upwardly extending arm 207 of the bracket 206 to move forwardly and release the holding force which it normally applies to the U-shaped bracket 196. At this time, the springs 208 will act upon the U-shaped bracket 196 and rotate that bracket in the counter clockwise direction about the pivot 198; and this means that the pivot 202 with its timing belt pulleys 204 will be forced to move downwardly. Those pulleys will cause the leading edges of the upper timing belts 270 to press the leading edge of the inserted bill into intimate engagement with the lower timing belts 272.

As the connecting rod 214 shifted forwardly toward the front plate 36, that rod moved the switch actuator 234 far enough in the clockwise direction in FIG. 3 to close the normally open switch 232. The closing of that switch completes a circuit through the phase winding of the motor 188 via conductor 452, junction 598, conductor 480, junction 481, conductor 432, contacts 524, conductor 434, the movable and upper fixed contacts of switch 290, conductor 436, contacts 530 and 532, junctions 570 and 600, conductor 429, junction 482, timer contacts 606, junction 484, switch 232, capacitor 190, the phase winding of the motor 188, junctions 492, 494, and 486, and conductors 488 and 490. The closing of the switch 232 also completes a circuit through the main winding of the motor 188 via conductor 452, junction 598, conductor 480, junction 481, conductor 432, contacts 524, conductor 434, the movable and upper fixed contacts of the switch 290, conductor 436, contacts 530 and 532, junctions 570 and 600, conductor 429, junction 482, timer contacts 606, junction 484, switch 232, conductor 496, contacts 558 and 560, junction 576, conductor 498, the main winding of the motor 188, conductor 500, contacts 554 and 552, junctions 574, 572, 582 and 590, and conductor 490. As a result, the motor 188 will start rotating in such a direction as to cause the timing belts 270 and 272 to start moving the inserted bill 400 toward the rear of the bill-transporting device.

It will be noted that the initial connection of the solenoid 230 and of the motor 188 to the terminal 412 of the plug 410 is through the relay contacts 530 and 532; and this means that a further connection must be established because the time constant of condenser 536 and resistor 538 is less than one half of a second and hence the contacts 530 and 532 can separate in less than one half of a second after the trailing edge of the bill has moved beyond the openings 55 and 123. The bill-actuated switches 274 and 278 provide that further connection for the solenoid 230 and the motor 188 when the timing belts 270 and 272 move the leading edges of the inserted bill 400 into engagement with the actuators 276 and 280 of those switches.

As the inserted bill 400 causes the actuators 276 and 280 to close the switches 274 and 278, a circuit will be established via conductors 452, and 450, switches 274 and 278, conductor 502, conductor 429, junction 482, timer contacts 606, junction 484, solenoid 230, junction 486, and conductors 488 and 490. Those switches will also complete a second circuit via conductors 452 and 450, switches 274 and 278, conductor 502, conductor 429, junction 482, timer contacts 606, junction 484, switch 232, capacitor 190, the phase winding of the motor 188, junctions 492, 494 and 486, and conductors 488 and 490. Those switches also complete a third circuit via conductors 452 and 450, switches 274 and 278, conductor 502, conductor 429, junction 482, timer contacts 606, junction 484, switch 232, conductor 496, contacts 558 and 560, junction 576, conductor 498, the main winding of the motor 188, conductor 500, contacts 554 and 552, junctions 574, 572, 582 and 590, and conductor 490. The overall result is that the bill-actuated switches 274 and 278 keep the solenoid 230 and the motor 188 energized; and those switches will keep that solenoid energized as long as either of them remains closed. Further, those switches will keep the motor 188 energized as long as the contacts 558 and 560 and the contacts 554 and 552 remain closed and either of the switches 274 and 278 remains closed. Consequently, although the relay coil 528 will become de-energized within one half of a second after the trailing edge of the inserted bill moves beyond the openings 55 and 123, the solenoid 230 and the motor 188 will continue to remain energized.

The timing belts 270 and 272 will continue to move the inserted bill 400 toward the rear of the bill-transporting device; and the leading edge of that bill will soon engage and move the actuator 284 of the switch 282 and thereby close that switch. Thereupon a circuit will be completed via conductors 452 and 450, switches 274 and 278, conductor 502, conductor 429, junctions 600 and 570, contacts 564 and 566, junction 568, conductor 604, switch 282, solenoid 330, junctions 494 and 486, and conductors 488 and 490. The resulting energization of the solenoid 330 will retract the plunger 332 and pull the connecting rod 334 toward the rear of the bill-transporting device, thereby rotating the carrier 323 in the counter clockwise direction in FIG. 2. That rotation causes the soft-faced roller 326 to engage the lower face of the inserted bill 400 and to press the upper face of that bill against the convex face of the magnetic head 244. The plunger 332 will fully seat itself, and it will thereby minimize the number of stray magnetic flux lines generated by the solenoid 330. As that plunger fully seats itself, it will apply such a strong upwardly-directed force to the roller 326 that the uppermost portion of the face of that roller will not only deform to conform to the convex curvature of the face of the magnetic head 244 but will also force that magnetic head to move upwardly. The spring 246 will yield to permit the mounting 242 for the magnetic head 244 to move upwardly and thereby permit the magnetic head to move upwardly. That spring will, however, exert a downwardly-directed force on the magnetic head 244 which is strong enough to urge the face of that magnetic head into intimate engagement with the inserted bill 400 and to keep the uppermost portion of the face of the roller 326 deformed.

The actuator 284 for the switch 282 is set far enough away from the front plate 36 to enable the leading edge of the bill 400 to pass between the magnetic head 244 and the soft-faced roller 326 before that leading edge moves the actuator 284. As a result, the magnetic head 244 and the roller 326 can not cause the leading edge of the bill 400 to crumple or roll up. However, the actuator 284 is set close enough to the front plate 36 to enable the leading edge of the bill 400 to move that actuator before the portrait background of that bill reaches the magnetic head 244. As a result, the magnetic head 244 will engage and sense the portrait background of the bill 400.

By the time the inserted bill 400 is moved into engagement with the actuator 284 of switch 282, that bill will have been raised to the desired synchronous speed; and the engagement of the roller 326 with that bill and the engagement of that bill with the magnetic head 244 will not keep that bill from continuing to move at synchronous speed. The continued movement of the inserted bill 400 past the magnetic head 244 will cause voltage variations to be generated in the coil of that magnetic head, all as disclosed in the said copending Smith et al. application. Those voltage variations will be sutably amplified by a tuned amplfier in the unit 426 of FIG. 19 and will cause the control element in that unit to produce two validating signals, all as disclosed in the said copending Smith et al. application.

The first of those two validating signals will energize the relay coil 428; and thereupon contact 439 will engage contact 440. At such time a circuit will be completed via conductors 452 and 450, switches 274 and 278, conductor 502, conductor 429, junctions 600 and 430, contacts 439 and 440, contacts 456 and 454, junction 448, relay coil 446, junctions 466, 480 and 590, and conductor 490. Relay contacts 442 and 444 will close; and the contacts 444 will establish a holding circuit for the coil 446.

As that first validating signal passes, the relay coil 428 will become de-energized and the contact 439 will move back up into engagement with the contact 438; and such engagement will complete a circuit via conductors 452 and 450, switches 274 and 278, conductor 502, conductor 429, junctions 600 and 430, contacts 439 and 438, now-closed contacts 442, junction 464, relay coil 462, junctions 466, 480 and 590, and conductor 490. Contacts 460 will then close to establish a holding circuit for coil 462; and the contact 456 will move down into engagement with the contact 458. Such movement will break the connection between the contact 456 and the relay coil 446; but the breaking of that connection can not de-energize that relay coil because of the holding circuit established by the contacts 444.

The second validating signal will again energize the relay coil 428; and the resulting downward movement of the contact 439 will complete a circuit via conductors 452 and 450, switches 274 and 278, conductor 502, conductor 429, junctions 600 and 430, contacts 439 and 440, contacts 456 and 458, relay coil 476, junctions 480 anl 590, and conductor 490. Relay contacts 470, 472 and 474 will then close; and the contacts 474 will complete a holding circuit for the coil 476. The closing of the contacts 470 will connect the terminal 412 of the plug 410 to the conductor 504 which, in turn, can be connected to a suitable terminal in the vending machine, change maker or other device to be controlled by the currency detector. The closing of the contacts 472 completes a circuit via conductor 452, junctions 598 and 468, contacts 472, conductor 506, relay coil 520, junctions 542, 572, 582 and 590, and condutor 490. The passing of the second validating signal will again de-energize the relay coil 428 and thus disconnect the contact 439 from the relay coil 476, but that coil will be kept energized by the holding circuit through contacts 474.

The energization of relay coil 520 will open contacts 522 and 524 and will close contacts 526. The opening of contacts 522 prevents the energization, at this time, of the relay coil 544; and the opening of the contacts 524 disconnects the terminal 412 from the relay contacts 384 and from the contact 530. The closing of the contacts 526 completes a circuit via conductor 452, conductor 450, switches 274 and 278, conductor 502, conductor 429, junctions 600 and 570, contacts 564 and 566, junction 568, conductor 604, contacts 526, conductor 602, solenoid 344, junctions 492, 494 and 486, and conductors 488 and 490. The resulting energization of the solenoid 344 will retract the plunger 346 and thereby shift the connecting rod 352 toward the front plate 36. That shifting will rotate the bracket 354 forwardly and downwardly; and the extension 353 thereof will move downwardly and release the gate 370. If no thread, tape or other member is attached to the bill 400, the gate 370 will be able to move down far enough to permit switch 362 to shift its movable contact. At this time, the trailing edge of the inserted bill 400 will have passed inwardly through the opening 374; and the gate 370 will then move downwardly to block the opening 38 in the front plate 36. In doing so, that gate will protect the patron from the loss of a further inserted bill. The gate 370 will remain in its lowered position, and the switch 362 will remain in its shifted position as long as the solenoid remains energized. Also at this time, the light from the lamp 366 will again pass to the light-sensitive cell 368; and that cell will become sufficiently conductive to enable the coil 382 to separate the contacts 384. The condenser 536 will start discharging through the serially-connected coil 528 and resistor 538; and that discharge will hold that coil energized for a period of less than one half of a second.

The bill 400 will continue to move rearwardly of the bill-transporting device; and its leading edge will engage and move the actuator of the switch 286. That switch is connected in parallel with the switches 274 and 278; and hence the closing of that switch will merely help maintain the circuits which were being maintained by the switches 274 and 278.

Further rearward movement of the inserted bill 400 will cause the leading edge of that bill to engage the actuator 292 of switch 290 and thereby move the movable contact of that switch into engagement with the lower fixed contact. Because the relay coil 520 was energized previously and is still energized, the movement of that movable contact will not produce any immediate change in the position of any other electrical component of the currency detector.

Continued rearward movement of the bill 400 will cause that bill to engage the actuators 296 and 300 of the switches 294 and 298. Thereupon, a circuit will be completed via conductors 452 and 450, switches 274 and 278 and 286, conductors 502 and 429, junction 482, conductor 508, junction 510, switches 294 and 298, junction 512, the movable and right-hand fixed contacts of switch 362, conductor 596, relay coil 578, junctions 582 and 590, and conductor 490. The resulting energization of relay coil 578 will close the contacts 584, 586 and 588. The closing of the contacts 584 will interconnect conductors 514 and 516; and those conductors can be suitably connected to terminals in the vending machine, change maker or other device controlled by this currency detector. The closing of the contacts 588 interconnects the conductors 518 and 519; and those conductors will be connected to suitable terminals in the vending machine, change maker or other device controlled by the currency detector. The closing of the contacts 586 will connect the conductor 429 to the terminal 412 via conductor 452, junction 598, conductor 480, junction 481, conductor 580, contacts 586, and junction 600. This is desirable because it enables the switches 294 and 298 to maintain the circuits which were maintained by the switches 274, 278 and 286.

The bill 400 will continue to move toward the rear of the bill-transporting device, and as that bill does so, its leading edge will pass between the small diameter rollers 314 and 321. Those rollers normally rotate at an angular rate which is greater than the angular rate at which the pulley 172 rotates. As long as the inserted bill 400 is held by the timing belts 270 and 272, it will be unable to move at a speed which is equal to the normal, high peripheral speed of the rollers 314 and 321. Further, as long as the inserted bill 400 engages the timing belts 270 and 272 as well as the small diameter rollers 314 and 321, those rollers will be held to a lower-than-normal peripheral speed. This means that the pulley 316 will not be able to rotate at its normal angular rate; and the overall result is that the helical torsion spring 176 will restore itself to its normal condition. As it does so, that spring will rapidly rotate the small diameter rollers 314 and 321 in the same direction in which they had been rotating; and that rapid rotation will give an added impetus to the movement of the bill 400 toward the cash box, not shown, which will be set adjacent the opening 136 in the rear plate 42.

As the inserted bill 400 successively moves out of engagement with the actuators 276, 280 and 288 of the switches 274, 278 and 286, the movable contacts of those switches will return to the positions shown by FIG. 18. However, the switches 294 and 298 will maintain the circuits previously maintained by the switches 274, 278 and 286. This means that the switches 294 and 298 will keep the solenoid 230, the solenoid 330, the solenoid 344, the motor 188, and the relay coils 446, 462 and 476 energized until the trailing edge of the bill 400 is passed rearwardly beyond the trailing edges of the timing belts 270 and 272.

As the trailing edge of the bill 400 moves out of engagement with the actuators 296 and 300 of the switches 294 and 298, those switches will break the connection to the relay coil 578. In addition, those switches will break the connection between the terminal 412 of plug 410 and the conductor 429; and the breaking of that connection will de-energize the solenoid 230, will de-energize the motor 188, will de-energize the solenoid 330, will de-energize the solenoid 344, and will de-energize the relay coils 446, 462 and 476. The de-energization of the coil 476 will permit the contacts 472 to reopen and thus causes the de-energization of the relay coil 520. As a result, all of the electrical components of the currency detector will return to the positions shown by FIGS. 18 and 19. At this time, the currency detector will be ready for the insertion of a further bill.

In the foregoing description of the operation of the currency detector of FIG. 1, it was assumed that the inserted bill 400 was an authentic bill; but if that bill had been a spurious bill, that currency detector would have rejected that bill. For example, if that bill had been a spurious bill, the relay coil 428 would not have received two validating signals; and hence the relay coil 476 would not have been energized. This means that the relay coil 520 also would not have been energized, because that coil is energized only by the closing of the contacts 472.

If the relay coil 520 had not become energized, the contacts 526 would then have been unable to close to energize the solenoid 344. As a result, the gate 370 would have had no chance to move downwardly from its raised position. Also, the contacts 524 would have been unable to open to separate the conductor 434 from the terminal 412 of the plug 410. Moreover, the contacts 522 would have been unable to open; and that fact is important in connection with the actuation of the switch 290 by the leading edge of the inserted bill 400.

Specifically, as the inserted bill 400 causes the movable contact of the switch 290 to move down into engagement with the lower fixed contact, a circuit will be completed via conductor 452, junction 598, conductor 480, junction 481, conductor 432, contacts 524, conductor 434, the movable and the lower fixed contacts of switch 290, conductor 501, conductor 592, junctions 548 and 546, relay coil 544, junctions 574, 572, 582 and 590, and conductor 490. The resulting energization of the relay coil 544 will disconnect conductor 604 from the terminal 412, as by moving the contact 564 away from the contact 566; and the downward movement of the contact 564 will also establish a holding circuit for the relay coil 544 through the contacts 564 and 562. The coil 544 will also move the contacts 558 and 552 downwardly; and, as it does so, it will reverse the connections to the main winding of the motor 188. As a result, that motor will immediately start rotating in the opposite direction; and that rotation will cause the timing belts 270 and 272 to move the inserted bill 400 back toward the opening 38 in the front plate 36.

The movement of the contact 564 downwardly away from the contact 566 will also de-energize the solenoid 330; and thereupon the spring within that solenoid will move the plunger 332 to the position shown by FIG. 2. As a result, the roller 326 will be moved downwardly and away from the magnetic head 244. This is desirable because it will facilitate unhampered movement of the inserted bill 400 back to the opening 38 in the front plate 36.

As the inserted bill 400 moves back toward the front plate 36, the innermost edge thereof will free the actuator of the switch 290 and permit the movable contact of that switch to move back up into engagement with the upper fixed contact of that switch. As that bill continues to move back toward the front plate 36, the outermost edge thereof will intercept the light beam that normally passes to the light-sensitive cell 368. As a result, the resistance of that cell will rise so high that the reduced current through the coil 382 will be unable to hold the contacts 384 apart. This means that the coil 528 will be energized via conductor 452, junction 598, conductor 480, junction 481, conductor 432, still-closed contacts 524, conductor 434, the movable and upper fixed contacts of the switch 290, conductors 436 and 628, now-closed relay contacts 384, conductor 594, rectifier 540, serially connected resistor 538 and coil 528, junctions 542, 572, 582 and 590, and conductor 490. The resulting energization of coil 528 will move contact 532 down into engagement with the contact 530; and a circuit will be completed via conductor 452, junction 598, conductor 480, junction 481, conductor 432, still-closed contacts 524, conductor 434, the movable and upper fixed contacts of switch 290, conductor 436, now-closed contacts 530 and 532, junctions 570 and 600, conductor 429, junction 482, timer contacts 606, junction 484, solenoid 230, junction 486, and conductors 488 and 490. A second circuit also will be completed via conductor 452, junction 598, conductor 480, junction 481, conductor 432, still-closed contacts 524, conductor 434, the movable and upper fixed contacts of switch 290, conductor 436, now-closed contacts 530 and 532, junctions 570 and 600, conductor 429, junction 482, timer contacts 606, junction 484, switch 232, capacitor 190, the phase winding of motor 188, junctions 492, 494 and 486, and conductors 488 and 490. A third circuit also will be completed via conductor 452, junction 598, conductor 480, junction 481, conductor 432, still-closed contacts 524, conductor 434, the movable and upper fixed contacts of switch 290, conductor 436, now-closed contacts 530 and 532, junctions 570 and 600, conductor 429, junction 482, timer contacts 606, junction 484, switch 232, conductor 496, now-closed contacts 558 and 556, conductor 500, the main winding of motor 188, conductor 498, now-closed contacts 550 and 552, junctions 574, 572, 582 and 90, and conductor 490. These three circuits will keep the belts 270 and 272 in tight engagement with the bill 400 and will keep the motor 188 running in the reverse direction until the innermost edge of that bill has been moved outwardly beyond the openings 55 and 123 for the light beam.

As the inserted billl moves outwardly through the opening 38 in the front plate 36, the trailing edge of that bill will successively pass out of engagement with the actuator 288 for switch 286 and the actuators 276 and 280, respectively, for switches 274 and 278. The movement of that trailing edge out of engagement with the actuator 288 will not de-energize the solenoid 230 because the relay contacts 384 will keep that solenoid energized. Similarly, as the innermost edge of the bill 400 moves out of engagement with the actuators 276 and 280, the switches 274 and 278 will return to their normally-open conditions, but the solenoid 230 will remain energized because the contacts 384 are still closed. Not until the bill 400 has moved wholly outwardly beyond the light beam will the contacts 384 re-open and permit the condenser 536 to start discharging. However, less than one-half of a second later, the coil 528 will become de-energized and the solenoid 230 will become de-energized. At such time, the spring 222 will rotate the rocker arm 224 in the counter clockwise direction and thereby shift the U-shaped bracket 206 from the position shown by FIG. 4 to the position shown by FIG. 3. That shift in position will cause the front end of the U-shaped bracket 196 to raise upwardly and lift the leading edges of the timing belts 270 out of engagement with the leading edges of the timing belts 272. As the spring 222 rotated the U-shaped bracket 206, that spring also shifted the actuator 234 of the switch 232 and thereby re-opened that switch. Thereupon, the motor 188 became de-energized and the currency detector came to rest. At such time, the bill 400 will be resting freely upon the platform 336, and the patron can easily retrieve that bill.

In this way, if the inserted bill does not coact with the magnetic head 244 to provide voltage variations that enable the unit 426 to produce two validating signals, the currency detector will not accept that bill. In such a case the currency detector will not permit that bill to move all the way to the rear of the platens 50 and 94. Instead, that currency detector will halt the forward movement of that bill almost immediately after the leading edge of that bill engages the actuator 292 for the switch 290; and this means that the forward direction of the bill will be stopped while the leading edge of that bill is spaced almost half the length of the platen 94 from the rear edge of that platen. Such an arrangement is desirable because it reduces the total time required to test and reject unacceptable bills.

The time delay relay 624 does not play a significant part in the operation of the bill-transporting device as long as the lamp 366 is intact. The motor of that relay will be energized whenever the solenoid 230 is energized, because the normally-closed contacts 606 place that solenoid and that motor in parallel; but the solenoid 230 and the motor of the relay 624 will normally be de-energized long before the actuator on the output shaft of that motor can open the contacts 606. However, if the lamp 366 burns out, the contacts 384 will remain closed indefinitely and will tend to keep solenoid 230 and motor 188 energized indefinitely. Indefinite energization of that solenoid and of that motor would be undesirable, and it is prevented by the time delay relay 624—that relay opening the contacts 606 within thirty seconds after the lamp 366 burns out. That relay will keep the contacts 606 open, and thus prevent energization of the solenoid 230 or of the motor 188 until the lamp 366 is replaced.

Referring to FIGS. 21 and 22, the numeral 700 denotes a lamp that is supported by a bracket 702—that bracket being suitably secured to the plate 130. That lamp is suitably shrouded to cause the light emanating therefrom to be directed toward the opening 123 in the platen 94. The numeral 704 denotes a light-sensitive element that is mounted on the bracket 702; and that light-sensitive element is suitably shrouded so it is responsive only to light which is reflected back up from the opening 123.

The lamp 700 is similar to the lamp 366 in FIG. 18, and it is energized by the transformer 380. The photosensitive element 704 is connected to an amplifier 706, which is supplied with power by the leads 707; and that amplifier can energize the coil 708. Normally-open contacts 710 are provided adjacent the coil 708; and those contacts will close whenever the coil 708 is energized.

The light from the lamp 700 will normally pass downwardly through the openings 123 and 55, respectively, in the platens 94 and 50; and where that is the case, the light-sensitive element 704 and the amplifier 706 will be unable to energize the coil 708. As a result, the contacts 710 will remain open and will prevent the energization of relay coil 528 in FIG. 19. However, when the leading edge of a bill is introduced between the platens 50 and 94 and is moved into register with the openings 123, enough light from the lamp 700 will be reflected back up to the light-sensitive element 704 to enable that element and the amplifier 706 to energize the coil 708. That coil will then close the contacts 710 and energize the relay coil 528 via conductor 452, junction 598, conductor 430, junction 481, conductor 432, contacts 524, conductor 434, the movable and upper fixed contacts of the switch 290, conductor 628, contacts 710, conductor 594, rectifier 540, resistor 538, coil 528, junctions 542, 572, 582 and 590, and conductor 490. The energization of the coil 528 will energize the solenoid 230 and the motor 188 and thus start a cycle of the currency detector, all as described hereinbefore.

The light-sensitive element 704 and the amplifier 706 will enable the coil 708 to hold the contacts 710 closed as long as the bill remains in register with the opening 123. By the time the trailing edge of that bill moves beyond the opening 123, the bill-operated switches 274, 278 and 286 will be keeping the solenoid 230 and the motor 188 energized.

If the movement of the movable contact of the switch 290 down into engagement with the lower fixed contact of that switch causes the motor-reversing relay coil 544 to become energized, or if the shifting of the movable contact of the switch 362 into engagement with the right-hand fixed contact of that switch enables the subsequent closing of the vend switches 294 and 298 to energize the motor-reversing relay coil 544, the bill will keep the solenoid 230 and the motor 188 energized as long as the bill remains in register with the opening 123. Not until the innermost edge of the bill is moved outwardly beyond the opening 123 will the solenoid 230 and the motor 188 be de-energized.

If the lamp 700 were to burn out, the light-sensitive element 704 could not receive the light which it needs to keep the coil 708 energized. As a result, if the lamp 700 were to burn out, the contacts 710 would open and would prevent the initiation of further cycles of the currency detector. As a result, the time delay relay 624 and its contacts 606 are not needed to protect against the burning out of the lamp 700; and in FIG. 22 that relay and those contacts have been deleted.

Whereas the drawing and accompanying description have shown and described a preferred embodiment of the present invention it should be apparent to those skilled in the art that various changes can be made in the form of the invention without affecting the scope thereof.

What we claim is:

In a bill-transporting device which has bill-gripping and transport members, which has a motor that actuates said bill-gripping and transport members to move a bill, which has means defining an entrance through which a bill may be inserted to be placed in a position where it can be gripped by said bill-gripping and transport members, and which has an energizing and control circuit for said motor to actuate said bill-gripping and transport members to move said bill forwardly toward a testing element and to move said bill rearwardly away from said testing element if said testing element finds said bill to be unacceptable; a lamp disposed between said entrance and said testing element in a position to direct light toward the position where a bill may be gripped by said bill-gripping members, a light-sensitive element in said energizing and control circuit, said lamp and said light-sensitive element being so mounted that light from said lamp normally does not reach said light-sensitive element but so that light from said lamp will be reflected onto said light-sensitive element when a bill occupies the position where it will be gripped by said bill-gripping members, said energizing and control circuit in response to the reflection of light from said bill onto said light-sensitive element energizing said motor to actuate said bill-gripping and transport members to move said bill towards said testing element, said energizing and control circuit including means responsive to the rejection of a bill by said testing element to reverse movement of said bill-gripping and transport members to move said bill away from said testing element and to keep said motor energized and operating until light is no longer reflected from said bill onto said light-sensitive element, said lamp being so positioned with respect to the position where said bill is gripped by said bill-gripping members and with respect to the position of said light-sensitive element to require at least the leading edge of a bill to reach said bill-gripping position before any light from said lamp can be reflected onto said light-sensitive element, the position of said lamp and the position of said light-sensitive element being such that normally no light from said lamp reaches said light-sensitive element and that no reflected light reaches said light-sensitive element until the leading edge of a bill disposed in bill-gripping position within said device interrupts light from said lamp when the latter is illuminated, thus enabling said bill-gripping and transport device to "fail safe" if said lamp burns out, said circuit including a voltage-regulating element that is connected in parallel with said light-sensitive element and that thereby limits the voltage across said light-sensitive element despite variations in the conductivity of said light-sensitive element.

References Cited in the file of this patent

UNITED STATES PATENTS

| | | |
|---|---|---|
| 2,701,613 | Klasing | Feb. 1, 1955 |
| 2,715,704 | Carrick | Aug. 16, 1955 |
| 2,903,965 | Eichenbaum | Sept. 15, 1959 |
| 2,932,392 | Burtner | Apr. 20, 1960 |
| 2,951,164 | Timms | Aug. 30, 1960 |
| 2,995,976 | Weingart | Aug. 15, 1961 |